(12) United States Patent
Charbit et al.

(10) Patent No.: US 8,761,099 B2
(45) Date of Patent: Jun. 24, 2014

(54) APPARATUS AND METHOD OF SCHEDULING RESOURCES FOR DEVICE-TO-DEVICE COMMUNICATIONS

(75) Inventors: Gilles Charbit, Farnborough (GB); Tao Chen, Salo (FI); Sami-Jukka Hakola, Kempele (FI); Timo Koskela, Oulu (FI)

(73) Assignee: Nokia Corporation, Espoo (FI)

( * ) Notice: Subject to any disclaimer, the term of this patent is extended or adjusted under 35 U.S.C. 154(b) by 303 days.

(21) Appl. No.: 13/145,105

(22) PCT Filed: Jan. 16, 2009

(86) PCT No.: PCT/IB2009/050163
§ 371 (c)(1),
(2), (4) Date: Jan. 18, 2012

(87) PCT Pub. No.: WO2010/082084
PCT Pub. Date: Jul. 22, 2010

(65) Prior Publication Data
US 2012/0106517 A1      May 3, 2012

(51) Int. Cl.
*H04W 4/00* (2009.01)
(52) U.S. Cl.
USPC .......................................................... 370/329
(58) Field of Classification Search
USPC .................................................. 370/328–339
See application file for complete search history.

(56) References Cited

U.S. PATENT DOCUMENTS

| | | | |
|---|---|---|---|
| 6,744,740 B2 * | 6/2004 | Chen ............................. | 370/255 |
| 7,308,266 B2 | 12/2007 | Du et al. | |
| 7,460,549 B1 * | 12/2008 | Cardei et al. .................. | 370/408 |
| 7,894,371 B2 * | 2/2011 | Bonta et al. .................... | 370/254 |
| 8,311,554 B2 * | 11/2012 | Abedi ............................. | 455/454 |
| 2004/0249888 A1 | 12/2004 | Berkey et al. ................. | 709/204 |
| 2005/0239451 A1 | 10/2005 | Periyalwar et al. | |
| 2005/0254449 A1 | 11/2005 | Halfmann et al. | |
| 2007/0183373 A1 | 8/2007 | Gao et al. | |
| 2009/0161617 A1 * | 6/2009 | Abedi ............................ | 370/329 |
| 2009/0325625 A1 | 12/2009 | Hugl et al. | |
| 2012/0093098 A1 | 4/2012 | Charbit et al. | |

FOREIGN PATENT DOCUMENTS

| | | |
|---|---|---|
| EP | 2012443 A2 | 1/2009 |
| WO | 2005/060182 A1 | 6/2005 |
| WO | 2009044335 A1 | 4/2009 |
| WO | 2010028690 A1 | 3/2010 |
| WO | 2010049801 A1 | 5/2010 |

OTHER PUBLICATIONS

"M2M Communication", 3GPP TSG-RAN-WG1 Meeting #54, R1-082813, Alcatel-Lucent, Jeju, Korea, Aug. 18-22, 2008, 7 pages.

(Continued)

*Primary Examiner* — Frank Duong
(74) *Attorney, Agent, or Firm* — Harrington & Smith

(57) ABSTRACT

An approach is provided for scheduling resources for device-to-device communications. A resource of a network is granted to a group designated for device-to-device communications. The group then determines how the resource allocation is utilized to support the communication session and allocates the resource among the user equipment within the group independently of the base station. Further, a user equipment pair in the group determines transmit/receive (Tx/Rx) timeslot configuration to allow TDD mode operations, and further configure the modulation and coding for the device-to-device connection, and error control scheme for the pair via control signaling independently from the group.

18 Claims, 16 Drawing Sheets

(56) References Cited

OTHER PUBLICATIONS

"M2M Communicaion", 3GPP TSG-RAN-WG1 Meeting #54bis, R1-083850, Agenda Item: 11, Alcatel-Lucent, Prague, Czech Republic, Sep. 29-Oct. 3, 2008, 7 pages.

"3rd Genereation Partnership Project; Technical Specification Group Radio Access Network;Evolved Universal Terrestrial Radio Access (E-Utra) Radio Resource Control (RRC); Protocol specification (Release 8)", 3GPP TS 36.331, v8.2.0, May 2008, pp. 1-151.

"3rd Generation Partnership Project; Technical Specification Group Radio Access Network; Evolved Universal Terrestrial Radio Access (E-UTRA) Medium Access Control (MAC) protocol specification (Release 8)", 3GPP TS 36.321, v8.2.0, May 2008, pp. 1-33.

"3rd Generation partnership Project; Technical Specification Group Radio Access Network; Evolved Universal Terrestrical Radio Access (E-UTRA); Physical Channels and Modulation (Release 8)", 3Gpp TS 36.211, v8.2.0, Mar. 2008, pp. 1-65.

"3rd Generation Partnership Project; Technical Specification Group Radio Access Network; Physical Layer Aspects for Evolved UTRA (Release 7)", 3GPP TR 25.814, v1.5.0, May 2006, pp. 1-125.

"3rd Generation Partnership Project; Technical Specification Group Radio Access Network; Evolved Universal Terrestrial Radio Access (E-UtTRA) and Evolved Universal Terrestrial Radio Access Network (E-UTRAN); Radio interface protocol aspects (Release 7)", 3GPP Tr 25.813, v7.1.0, Sep. 2006, pp. 1-41.

"3rd Generation Partnership Project; Technical Specification Group Services and System Aspects; 3GPP System Architecture Evolution: Report on Technical Options and Conclusions (Release 8)", 3GPP TR 23.882, v8.0.0, Sep. 2008, pp. 1-234.

"3rd Generation Patrnership Project;Technical Specification Group Radio Access Network;Evolved Universal Terrestrial Radio Access (E-UTRA) and Evolved Universal Terrestrial Radio Access Network (E-UTRAN); Overall description; Stage 2 (Release 8)", 3GPP TS 36.300, v8.7.0, Dec. 2008, pp. 1-144.

International Search Report and Written Opinion received for corresponding Patent Cooperation Treaty Application No. PCT/IB2009/050163, dated Nov. 5, 2009, 12 pages.

Office Action received for corresponding European Patent Application No. 09786293.2, dated May 15, 2012, 4 pages.

International Search Report and Written Opinion, received in corresponding Patent Cooperation Treaty Application No. PCT/IB2011/052143, dated Oct. 3, 2011, 11 pages.

Hyukjin, Lee, "Cluster-Based Multi-Channel Scheduling Algorithms for Ad Hoc Networks", Wireless and Optical Communications Networks, 2007. WOCN '07. IFIP International Conference on, pp. 1-5, Jul. 2-4, 2007.

\* cited by examiner

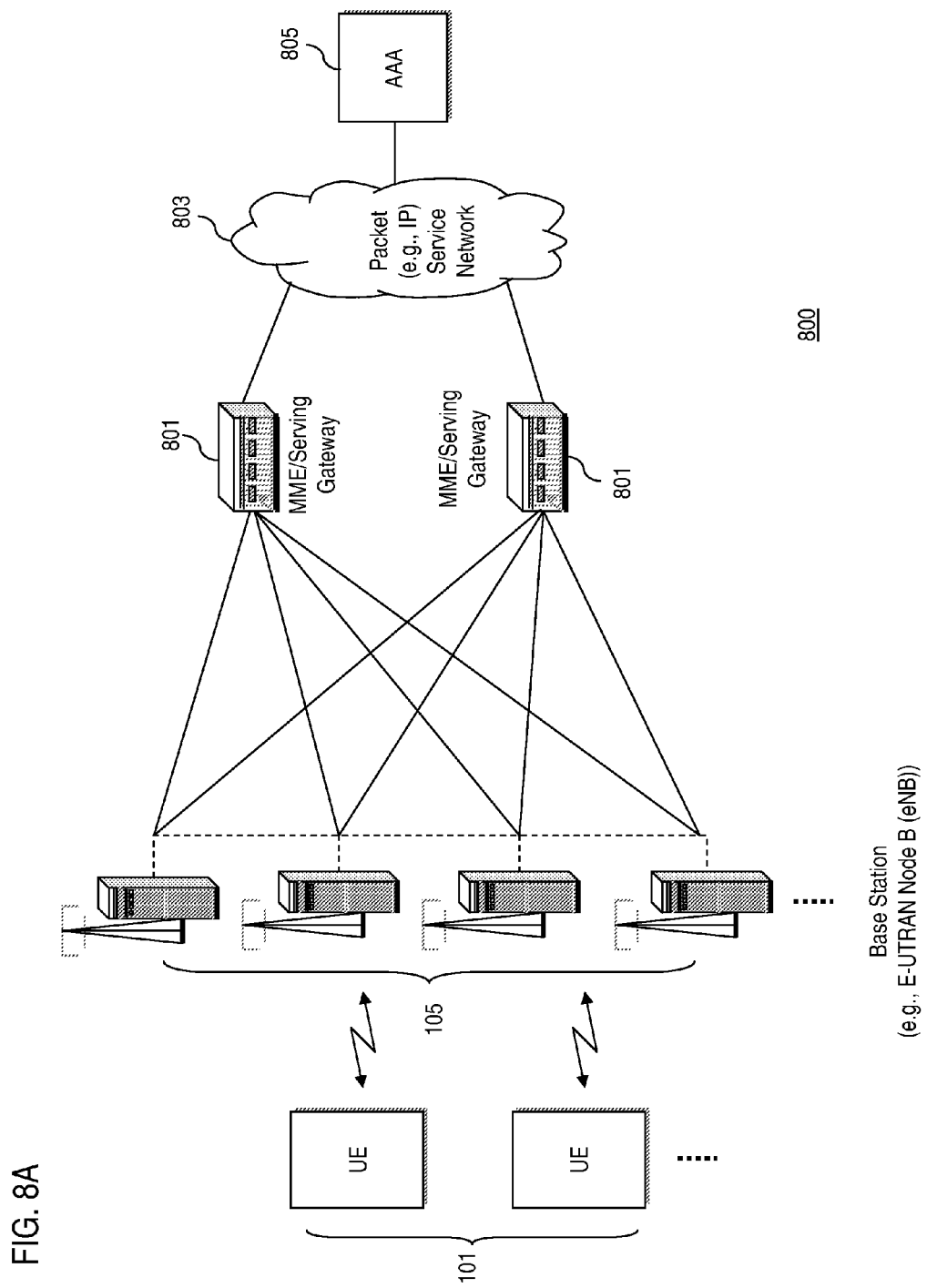

APPARATUS AND METHOD OF SCHEDULING RESOURCES FOR DEVICE-TO-DEVICE COMMUNICATIONS

RELATED APPLICATION

This application was originally filed as PCT Application No. PCT/IB2009/050163 filed on Jan. 16, 2009, which is incorporated herein by reference in its entirety.

BACKGROUND

Radio communication systems, such as a wireless data networks (e.g., Third Generation Partnership Project (3GPP) Long Term Evolution (LTE) systems, spread spectrum systems (such as Code Division Multiple Access (CDMA) networks), Time Division Multiple Access (TDMA) networks, Orthogonal Frequency Division Multiplexed (OFDMA) networks, spatially multiplexed networks, WiMAX (Worldwide Interoperability for Microwave Access), etc.), provide users with the convenience of mobility along with a rich set of services and features. This convenience has spawned significant adoption by an ever growing number of consumers as an accepted mode of communication for business and personal uses. To promote greater adoption, the telecommunication industry, from manufacturers to service providers, has agreed at great expense and effort to develop standards for communication protocols that underlie the various services and features. One area of effort involves scheduling of resources in the communication links. Such scheduling procedure is particularly challenging in view of the many processes that are concurrently performed during direct device-to-device (D2D) communications within a network environment. These processes can reduce the efficiency of the resource allocation procedure for device-to-device communications.

SOME EXEMPLARY EMBODIMENTS

Therefore, there is a need for an approach for scheduling resources for device-to-device communication, which can co-exist with already developed standards and protocols.

According to one embodiment, a method comprises designating two user equipment as a pair for device-to-device communications, each of the user equipment being configured to communicate directly with each other. The method also comprises designating one of the user equipment within the pair as a pair head. The method further comprises allocating an orthogonal resource of a network to the pair, wherein the pair head is configured to determine a transmit/receive (Tx/Rx) timeslot configuration of the resource allocated to the pair.

According to another embodiment, an apparatus comprises a logic configured to designate two user equipment as a pair for device-to-device communications, each of the user equipment being configured to communicate directly with each other. The logic is also configured to designate one of the user equipment within the pair as a pair head. The logic is further configured to allocate an orthogonal resource of a network to the pair, the pair head determining a transmit/receive (Tx/Rx) timeslot configuration of the resource allocated to the pair.

According to another embodiment, an apparatus comprises means for designating two user equipment as a pair for device-to-device communications, each of the user equipment being configured to communicate directly with each other. The apparatus also comprises means for designating one of the user equipment within the pair as a pair head. The apparatus further comprises means for allocating an orthogonal resource of a network to the pair, wherein the pair head is configured to determine a transmit/receive (Tx/Rx) timeslot configuration of the resource allocated to the pair.

According to another embodiment, a method comprises receiving an allocation of an orthogonal network resource from a base station for device-to-device communication among a group of user equipment. The method also comprises receiving an indication to act as a group head for the device-to-device communication. The method further comprises allocating the resource to the other user equipment within the group based at least in part on one or more of a buffer status report from the pair head and the other user equipment in the pair, device-to-device link quality measurement, and requested Quality of Service (QoS) level.

According to another embodiment, an apparatus comprises a logic configured to receive an allocation of an orthogonal network resource from a base station for device-to-device communication among a group of user equipment. The logic is also configured to receive an indication to act as a group head for the device-to-device communication. The logic is further configured to allocate the resource to the other user equipment within the group based at least in part on one or more of a buffer status report from the pair head and the other user equipment in the pair, device-to-device link quality measurement, and requested Quality of Service (QoS) level.

According to another embodiment, an apparatus comprises means for receiving an allocation of an orthogonal network resource from a base station for device-to-device communication among a group of user equipment. The apparatus also comprises means for receiving an indication to act as a group head for the device-to-device communication. The apparatus further comprises means for allocating the resource to the other user equipment within the group based at least in part on one or more of a buffer status report from the pair head and the other user equipment in the pair, device-to-device link quality measurement, and requested Quality of Service (QoS) level.

According to another embodiment, a method comprises receiving an allocation of an orthogonal network resource for device-to-device communication between a pair of user equipment. The method also comprises receiving an indication to act as a pair head for the device-to-device communication. The device initiating the D2D connection request may be designated as the device pair head. The method further comprises allocating the resource to the other user equipment within the pair by changing a transmit/receive (Tx/Rx) timeslot configuration allowing Time Domain Duplexing (TDD) mode operations based at least in part on one or more of a buffer status report from the pair head and the other user equipment in the pair, device-to-device link quality, and Quality of Service (QoS) required for the device-to-device connection.

According to yet another embodiment, an apparatus comprises a logic configured to receive an allocation of an orthogonal network resource for device-to-device communication between a pair of user equipment. The logic is also configured to receive an indication to act as a pair head for the device-to-device communication. The logic is further configured to allocate the resource to the other user equipment within the pair by changing a transmit/receive (Tx/Rx) timeslot configuration allowing Time Domain Duplexing (TDD) mode operations based at least in part on one or more of a buffer status report from the pair head and the other user equipment in the pair, device-to-device link quality, and Quality of Service (QoS) required for the device-to-device connection.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 8A-8D are diagrams of communication systems having exemplary long-term evolution (LTE) architectures, in which the system of FIG. 1 can operate, according to various exemplary embodiments of the invention;

DESCRIPTION OF PREFERRED EMBODIMENT

An apparatus, method, and software for scheduling resources for device-to-device (D2D) communications are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the embodiments of the invention are discussed with respect to a wireless network compliant with the Third Generation Partnership Project (3GPP) Long Term Evolution (LTE) or EUTRAN (Enhanced UMTS (Universal Mobile Telecommunications System) Terrestrial Radio Access Network)) architecture, it is recognized by one of ordinary skill in the art that the embodiments of the inventions have applicability to any type of communication system (e.g., WiMAX (Worldwide Interoperability for Microwave Access)) and equivalent functional capabilities. Additionally, while a mechanism for adaptively changing a transmit/receive (Tx/Rx) timeslot configuration is explained in the context of device pairs, it is contemplated that any number of devices may participate in a D2D communication session.

Figure 1:
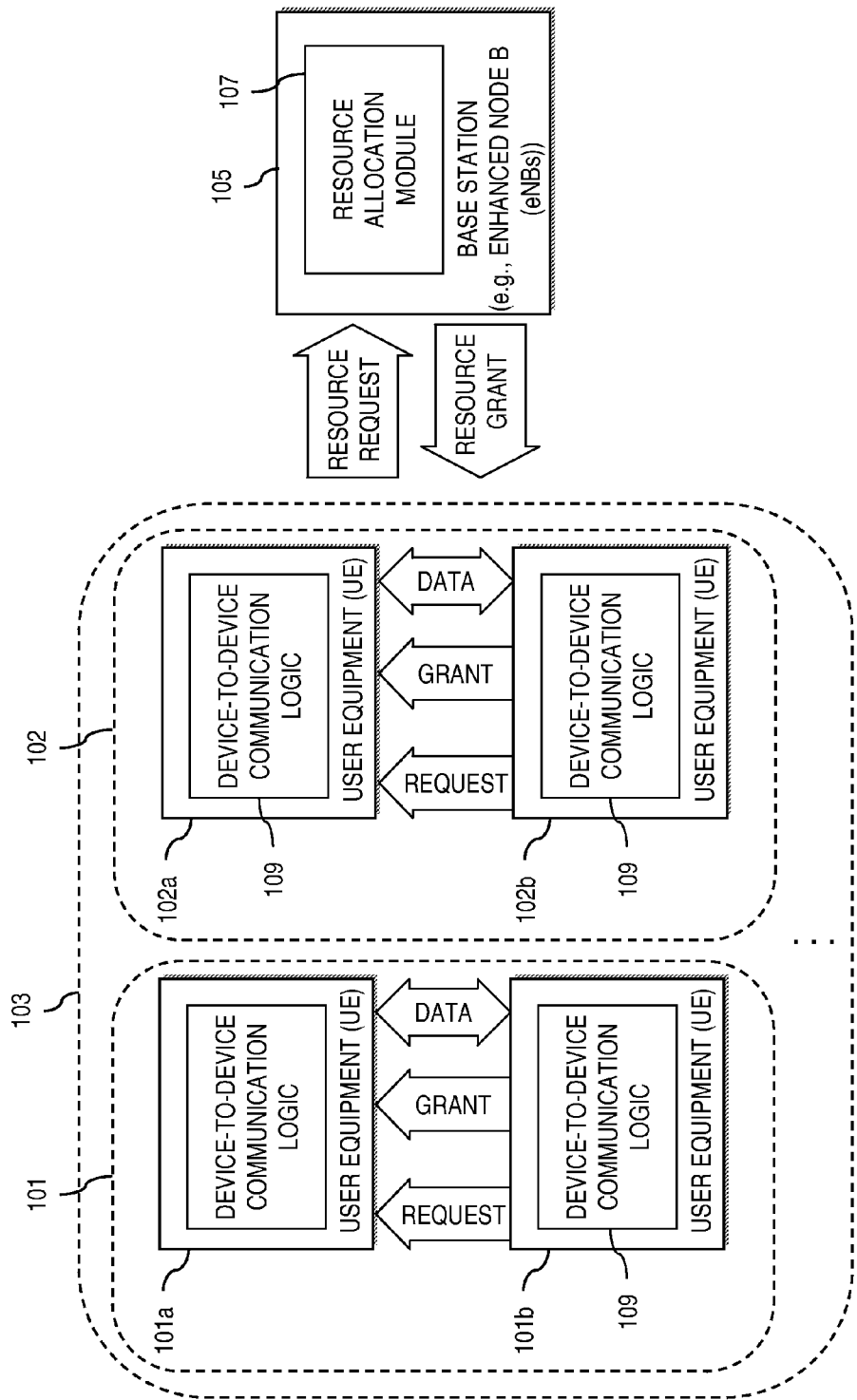
FIG. 1 is a diagram of a communication system capable of scheduling resources for device-to-device communications, according to an exemplary embodiment.

FIG. 1 is a diagram of a communication system capable of scheduling resources for device-to-device communications, according to an exemplary embodiment. As shown, a communication system 100 (e.g., a wireless network) includes one or more user equipment (UEs) (e.g., UEs 101a, 101b, 102a, 102b) organized as a group 103 for D2D communications. In this exemplary embodiment, the UEs 101a and 101b form a device pair 101, and the UE 102a and 102b form another device pair 102. Hence, the group 103 includes two device pairs 101 and 102. It is contemplated that exemplary embodiments may include groups containing any number of device pairs. The UEs 101a, 101b, 102a, and 102b communicate with a base station 105, which is part of an access network (e.g., 3GPP LTE or E-UTRAN, etc.) (not shown) with integrated D2D communications. The integration means that UEs 101a and 101b within device pair 101 and UEs 102a and 102b within device pair 102, which have a direct physical communication link within their corresponding pair, share network resources with other devices having a traditional connection to the base station 105. It is noted that D2D communications when compared to traditional network operations have the potential to reduce transmitter power consumption and increase network capacity.

For example, under the 3GPP LTE architecture (as shown in FIGS. 8A-8D), the base station 105 is denoted as an enhanced Node B (eNB). The UEs 101a,101b, 102a, and 102b can be any type of mobile stations, such as handsets, terminals, stations, units, devices, multimedia tablets, Internet nodes, communicators, Personal Digital Assistants (PDAs) or any type of interface to the user (such as "wearable" circuitry, etc.). The UEs 101a, 101b, 102a, and 102b also may be fixed terminals, mobile terminals, or portable terminals. The system, according to one embodiment, operates using the Frequency Division Duplex (FDD) mode of 3GPP, as well as a Time Domain Duplexing (TDD) mode.

In the TDD mode of operation, it is recognized that for TDD configurations (where there are more uplink resources than downlink resources), generally more uplink allocations are performed for a user within a single downlink timeslot (Packet Data Control Channel (PDCCH)). This control channel is used to convey scheduling information to the UEs 101a, 101b, 102a, and 102b.

According to certain embodiments, the system 100 enables the scheduling of a network resource for D2D communications to group 103 using a hierarchical scheme. For example, in a first step, the eNB 105 allocates network resources for D2D communications to the group 103. This allocation may be granted to a UE (e.g., UE 101a) that has been designated by the eNB 105 to act as the group head and receive the allocation on behalf of the group 103. The group head, UE 101a, may then independently allocate the resource among the device pairs 101 and 102 within the group 103. Each device pair may, in turn, have a designated device pair head to receive the allocation from the group head, UE 101a. For instance, UE 101a (in addition to acting as the group head) may act as the device pair head for device pair 101 and may change the resource allocation timeslot configuration (e.g., transmit/receive (Tx/Rx) timeslot configuration or uplink/downlink timeslot configuration) for the slave UE 101b in response to, for instance, changing traffic loads. Similarly, UE 102*a* may act as the device pair head for device pair 102 and may adaptively change the resource allocation timeslot configuration (e.g., transmit/receive (Tx/Rx) timeslot configuration or uplink/downlink timeslot configuration) for the slave UE 102*b*.

Traditionally, one of the advantages of the TDD mode of operation is the flexibility to allocate resources in response to changing communication traffic loads. However, it is difficult for the eNB 105 to adaptively configure a D2D switching point for the timeslot configuration because the eNB 105 may require extensive signaling between the eNB 105 and the UEs within D2D group 103 for efficient switching. For example, while the UEs 101*a*, 101*b*, 102*a*, and 102*b* know the D2D traffic load between the respective device pairs 101 and 102 quite well, the devices would need to report the traffic to the eNB 105 for adaptive switching in a system where the eNB 105 is responsible for setting the timeslot configuration. The eNB 105 would then decide the appropriate Tx/Rx switching point and grant the Tx/Rx switching point to the grouped UEs 101*a*, 101*b*, 102*a*, and 102*b*. The signaling between the eNB 105 and device pairs 101 and 102 may introduce significant delay and resource requirements. Therefore, D2D Tx/Rx switching controlled by eNB 105 may not be efficient as the eNB 105 would need to do this for all the device pairs in the group 103—i.e. device pairs 101 and 102 in the example.

The system 100 addresses this problem by providing a mechanism for the UEs 101*a* and 101*b* in device pair 101, or the UEs 102*a* and 102*b* in device pair 102, engaged in a D2D communication session to adaptively allocate resources among themselves without direct intervention from the eNB 105.

In exemplary embodiments, the eNB 105 employs a transceiver (not shown) to exchange information with the UEs 101*a*, 101*b*, 102*a*, and 102*b* via one or more antennas, which transmit and receive electromagnetic signals. For instance, the eNB 105 may utilize a Multiple Input Multiple Output (MIMO) antenna system for supporting the parallel transmission of independent data streams to achieve high data rates with the UEs 101*a*, 101*b*, 102*a*, and 102*b*. The eNB 105 may use orthogonal frequency divisional multiplexing (OFDM) as a downlink (DL) transmission scheme and a single-carrier transmission (e.g., single carrier-frequency division multiple access (SC-FDMA)) with cyclic prefix for the uplink (UL) transmission scheme. SC-FDMA can also be realized using a DFT-S-OFDM principle, which is detailed in 3GGP TR 25.814, entitle "Physical Layer Aspects for Evolved UTRA," v.1.5.0, May 2006 (which is incorporated herein by reference in its entirety). SC-FDMA, also referred to as Multi-User-SC-FDMA, allows multiple users to transmit simultaneously on different sub-bands.

In exemplary embodiments, the system 100 uses concatenation of Forward Error Correction (FEC) coding and an Automatic Repeat request (ARQ) protocol commonly known as Hybrid ARQ (H-ARQ). Automatic Repeat Request (ARQ) is an error detection mechanism used on the link layer. This mechanism permits the receiver to indicate to the transmitter that a packet or sub-packet has been received incorrectly, and thus, requests the transmitter to resend the particular packet (s); it is noted the UEs 101*a*, 101*b*, 102*a*, and 102*b* can act as either receiver or transmitter. This can be accomplished with a Stop and Wait (SAW) procedure, in which the transmitter waits for a response from the receiver before sending or resending packets. That is, Hybrid ARQ (H-ARQ) provides a link adaptation mechanism, and is a combination of ARQ and Forward Error Correction (FEC) techniques. The erroneous packets are used in conjunction with retransmitted packets. Two conventional techniques include, for example, a synchronous H-ARQ mechanism, and an Asynchronous Adaptive Incremental Redundancy (AAIR).

By way of example, in traditional LTE mode, the eNB 105 controls allocation of the uplink resources (e.g., resource allocation module 107) for the group 103 including device pairs 101 and 102; that is, all control of the uplink resources are granted and revoked by the eNB 105. Under the LTE architecture, fast hybrid automatic repeat request (H-ARQ) can be used to increase spectral efficiency. The normal H-ARQ operation for dynamic scheduled uplink data is that for each uplink resource grant (signalled on a downlink control channel (e.g., a physical downlink control channel (PD-CCH)) there is an associated H-ARQ feedback channel for positive and negative acknowledgements (ACK/NACK). It is recognized that there is a delay between the time of the uplink grant (on the PDCCH) to the time when, for example, the UEs 101*a* or 101*b* in device pair 101 actually transmit data to each other using uplink resources, and a further delay to the time when the UEs 101*a* or 101*b* send the corresponding ACK/NACK on, for instance, the PUCCH (Physical Uplink Control Channel).

In exemplary embodiments, the eNB 105 allocates resources to the D2D group 103 as a whole using the traditional allocation approach. However, the traditional concept of uplink and downlink allocation timeslots are not used for D2D communications (e.g., the LTE TDD shared and common control signalling and special timeslots are not needed for a D2D link). Instead, the D2D group 103 may itself decide how to use the uplink resources (e.g., using D2D communication logic 109) dynamically allocated to the group 103 by the eNB 105 in a distributed and dynamic way (i.e., Tx/Rx timeslot configuration, link adaptation (LA), adaptive modulation coding (AMC), and H-ARQ retransmissions).

Figure 2A:
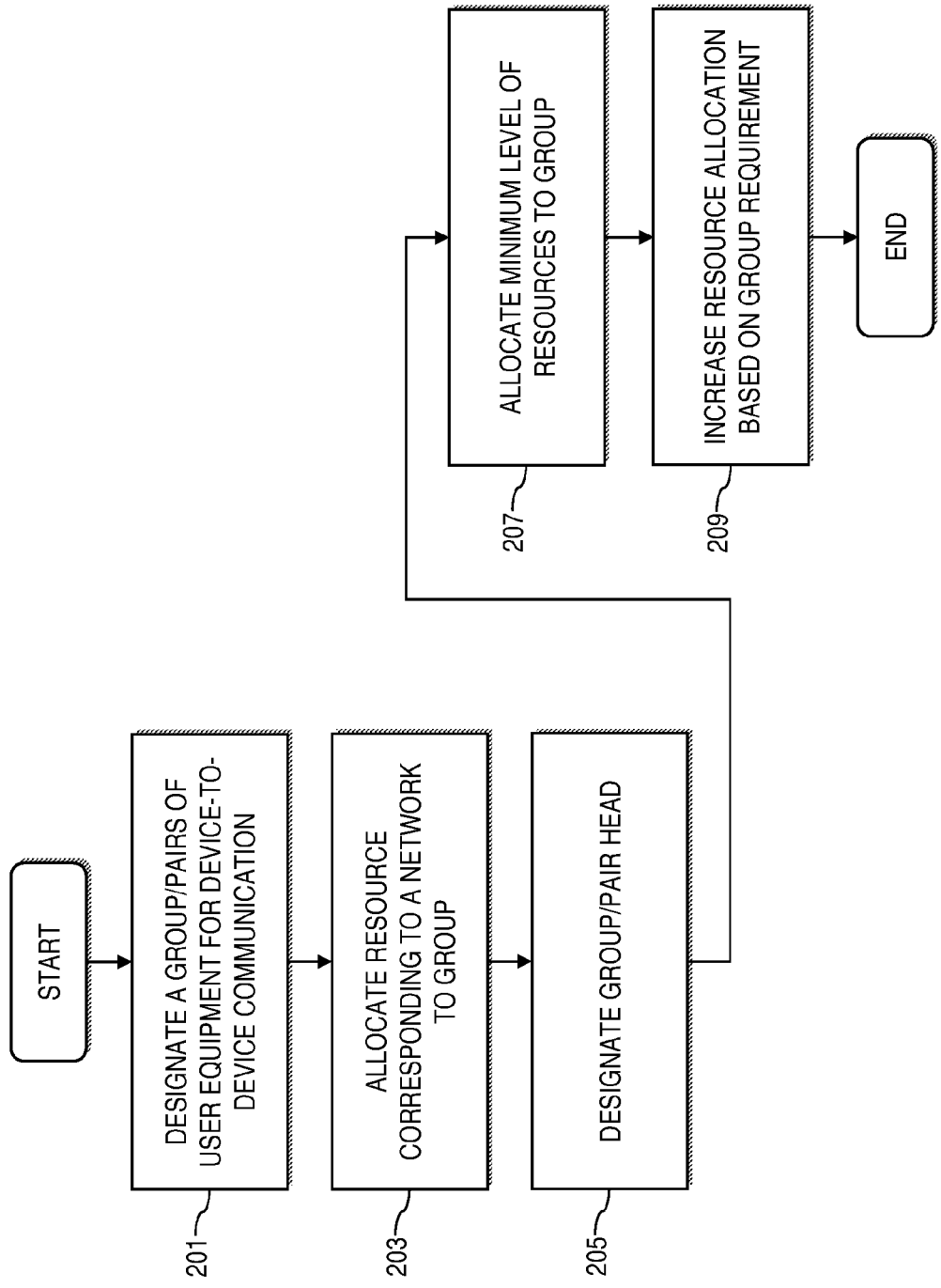
FIGS. 2A-2C are flowcharts of processes for scheduling resources for device-to-device communications from the perspective of a base station, group head, and device pair head, respectively, according to various exemplary embodiments.
Figure 2B:
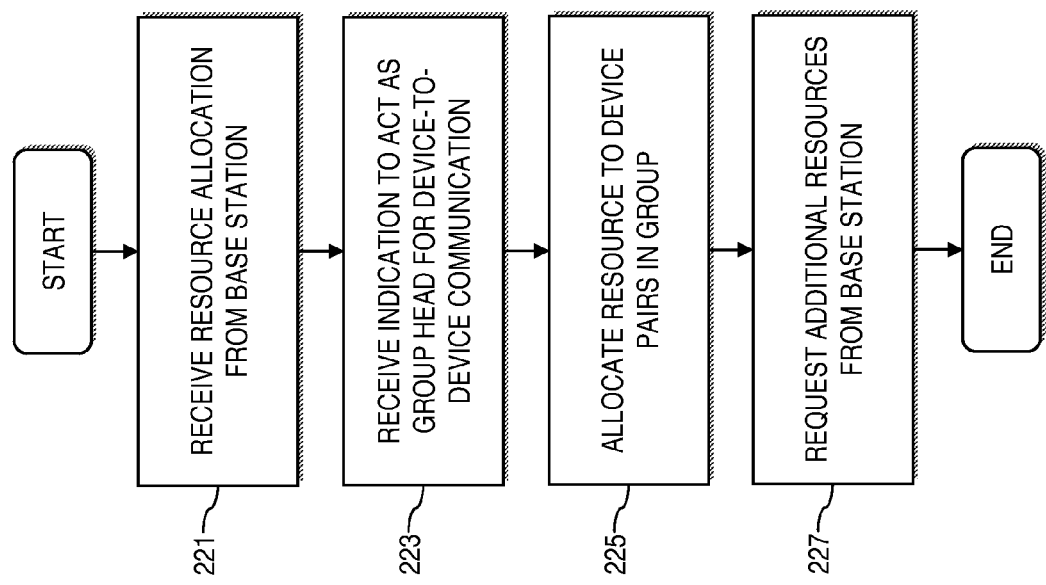
Figure 2C:
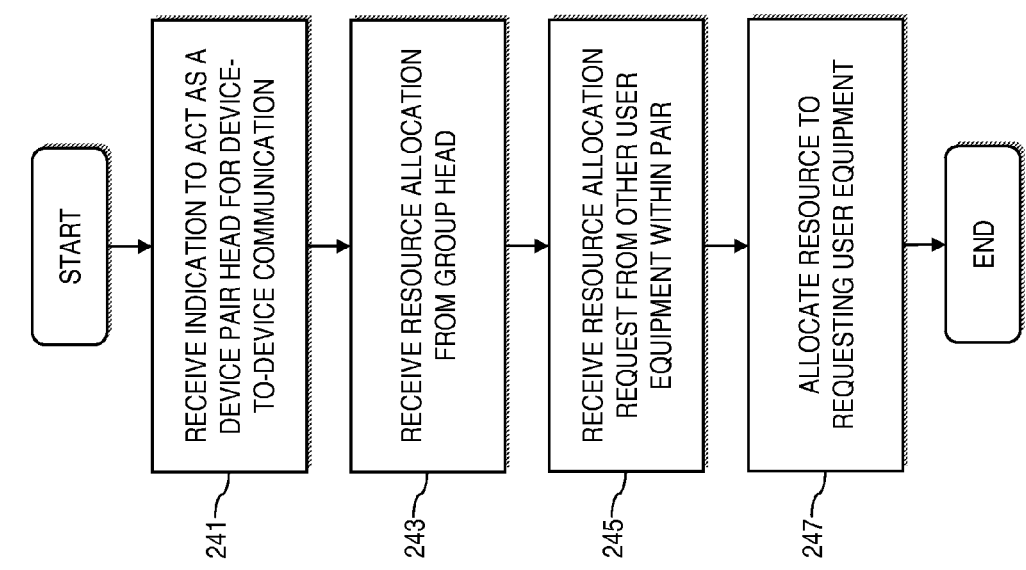

FIGS. 2A-2C are flowcharts of processes for scheduling resources for device-to-device communications from the perspective of a base station, group head, and device pair head, respectively, according to various exemplary embodiments. In step 201 of FIG. 2A, the eNB 105 designates a group 103 of UEs 101*a*, 101*b*, 102*a*, and 102*b* for D2D communications. In exemplary embodiments, the designation of the group 103 may be initiated, for instance, when one UE (e.g., UE 101*a*) initiates a D2D communication link with another UE (e.g., UE 101*b*). In addition, the group may be further organized into device pairs in which the UEs (e.g., UE 101*a*, 101*b*, 102*a*, and 102*b*) within each device pair (e.g., device pairs 101 and 102) are independently engaged in a D2D communication session with their corresponding paired UE. After designating a group 103 containing pairs 101 and 102, the eNB 105 allocates uplink resources to the group 103 for device-to-device communications among the UEs within each device pair (e.g., device pairs 101 and 102) of the group 103. The eNB 105 may make this allocation either dynamically (i.e., resources are allocated as needed or requested by the group) or semi-persistently (i.e., a set level of resources are allocated) (step 203). In an exemplary embodiment, the eNB 105 may, for example, dynamically grant a resource allocation to the group 103 using a common D2D radio network temporary identifier (RNTI). The resource allocation may, for instance, be for orthogonal resources to minimize the potential for interference.

To facilitate the resource allocation to the group 103, the eNB 105 designates one of the UEs (e.g., 101*a*) within the group 103 as the group head. It is contemplated that the eNB 105 may use any process for designating a group head (e.g., UE of closest proximity or greatest transmission power relative to the eNB 105). As discussed previously, the group head is responsible for receiving the resource allocation from the eNB 105 on behalf of the group (step 205). The group head can then independently allocate the resources granted by the eNB 105 to the other UEs within the group (e.g., see process of FIG. 2B). If the group contains device pairs, the eNB 105 also designates one of the UEs within each pair as the device pair head. For example, the eNB 105 may designate the UE initiating the D2D communication session as the device pair head (step 205). The device pair head will then be responsible for further allocating the resources granted by the group head to the other UE within the pair (e.g., see process of FIG. 2B).

In certain embodiments, the eNB 105 may make an initial semi-persistent allocation of a minimum level of resources (e.g., using semi-persistent resource allocation) to the group 103 (step 207). For example, the minimal resource allocation may include implicit scheduling of resources used for enable an error-control scheme (e.g., a synchronous H-ARQ scheme). As group 103 proceeds with its D2D session, the eNB 105 dynamically allocates additional resources based at least in part on the resource requirements of each group (step 209). For instance, the group head of each group may directly request additional resources from the eNB 105 when the group 103 needs additional resources (e.g., when the group is heavy FTP download) or for when performing an asynchronous error-control scheme (e.g., asynchronous H-ARQ). The eNB also may itself decide to dynamically allocate additional resources to the group 103 during, for example, radio bearer configuration during which quality of service (QoS) or data requirements may be specified. Additional resources may also be allocated based at least in part on, for instance, buffer status reports from the device pair heads or other determinations of D2D link quality.

FIG. 2B depicts the process of scheduling resources for D2D communications from the perspective of a UE (e.g., UE 101a) that has been designated as the group head, according to an exemplary embodiment. In step 221, the UE 101a receives an uplink resource allocation from the eNB 105 for D2D communications among the UEs within the group (e.g., between UEs 101a and 101b of device pair 101, and UEs 102a and 102b of device pair 102). The UE 101a then receives an indication from the eNB designating the UE 101a as the group head for the particular D2D communication session (step 223). It is noted that UE 101a may act as both the group head with respect to the entire group 103 and as a device pair head with respect to device pair 101. In exemplary embodiments, this designation lasts for the duration of the D2D communication session. It is contemplated that the eNB 105 may designate another group head during a communication (e.g., in case the group head ends the group head's participation with other UEs still active in the D2D session).

The group head (e.g., UE 101a) may then allocate the resources granted by the eNB 105 to the other UEs within the group 103 via the device pair heads (e.g., UE 102a) using, for example, either a semi-persistent or dynamic scheduler (step 227). The allocation from the group head to the device pair head may be based, for instance, on the device pair head's buffer status report, D2D link quality measurement, and/or the required QoS level. The group head UE 101a may also dynamically request additional resources on behalf of the group 103 from the eNB 105 (e.g., when the UE 102a does not have enough resources to meet the request from UE 102b and no more resources are available from the group 103) (step 229).

FIG. 2C depicts the process of scheduling resources for D2D communications from the perspective of a UE (e.g., UE 102a) that has been designated as the device pair head, according to an exemplary embodiment. In step 241, a UE that is part of a D2D device pair receives an indication from the eNB 105 to act as the pair head for device pair 102. As the pair head, the UE 102a receives a resource allocation from the group head, UE 101a, on behalf of the device pair 102 for D2D communications (step 243). In certain embodiments, the pair head UE 102a may also receive the resource allocation directly from the eNB 105. As the D2D session progresses, the device pair head receives resource allocation requests (e.g., requests to change the Tx/Rx switching point) from the other UE 102b within the device pair 102 (step 245) in a designated Tx timeslot in the current frame. The request may be for either more or less resources based at least in part on, for instance, the buffer status report from the other user equipment in the pair and its own buffer status, device-to-device link quality, and/or a requested QoS level. The request may be a relative request (e.g., the UE 102b may make a request for one more or one less timeslot) or an absolute request for a specified number of timeslots.

In exemplary embodiments, the resource allocation request can be signalled using piggyback information. For instance, a relative request may include a single piggyback bit in which a value of 1 indicates a request for one more timeslot and a value of −1 indicates a request for one less timeslot. Similarly, an absolute request for a specific number of timeslots may also be signalled using piggyback information (e.g., N bits where N=log 2(TotalTxRxSlotNum) and TotalTxRxSlotNum represents the total number of timeslots available for transmitting and receiving).

In response to the request, the device pair head (e.g., UE 102a) allocates the resource to the requesting slave device UE 102b (step 247) in a designated Rx timeslot in the next frame. It is noted that the device pair head may also change resource allocations based at least in part on its own traffic load. In exemplary embodiments, the resource allocation is made by setting an appropriate timeslot configuration to support the resource request. For example, the device pair head UE 102a indicates a timeslot configuration for uplink grants to the UE 102b. As mentioned previously, the signalling for a D2D resource allocation can be simpler than traditional resource allocation process. For example, in exemplary embodiments, the device pair head (e.g., UE 101a or UE 102a) may signal the resource allocation to the other UE (e.g., UE 101b or UE 102b, respectively) within the device pair by piggyback signalling (e.g., on a D2D physical downlink control channel (PDCCH)). Moreover, the device pair head may configure the Tx/Rx timeslot for HARQ re-transmissions with slave UE 102b using the resources from the group 103 as allocated by the group head, UE 101a. Once the resources are allocated, the group 103 can proceed with D2D communications. It is noted that each device pair (e.g., device pairs 101 and 102) within the group 103 may set different timeslot configurations using the described process.

Figure 3:
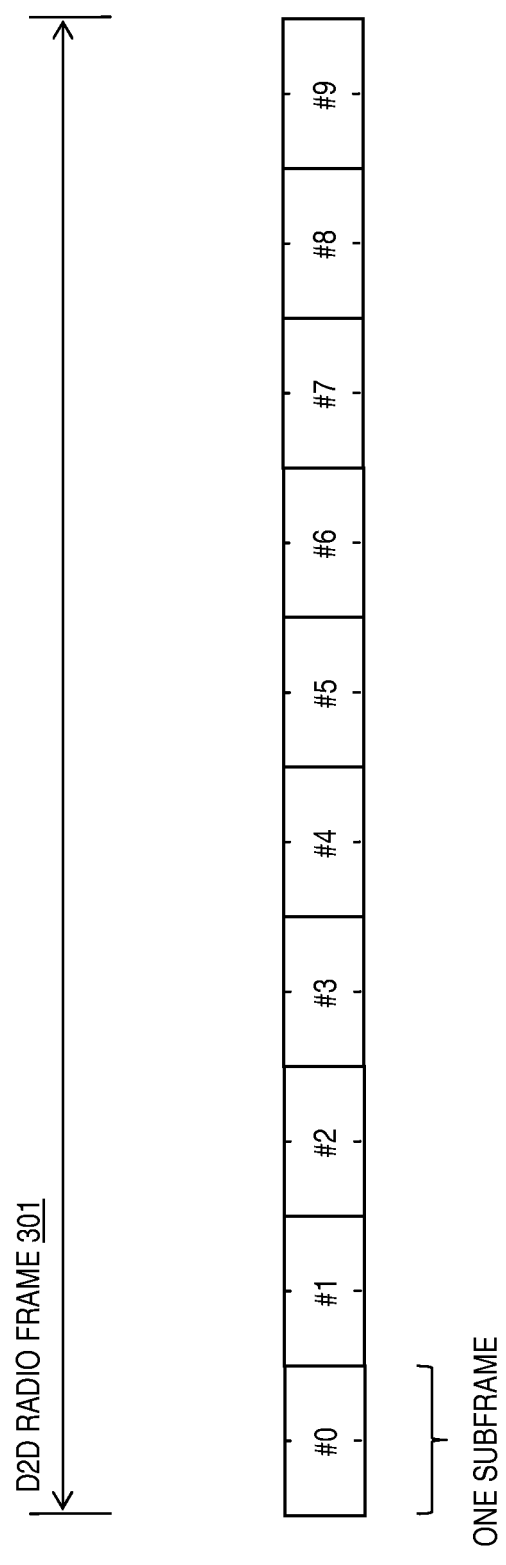
FIG. 3 is a diagram of a radio frame format for device-to-device communications, according to an exemplary embodiment.

FIG. 3 is a diagram of a radio frame format for device-to-device communications, according to an exemplary embodiment. The D2D frame structure for transmissions may, for instance, be the same as the LTE FDD/TDD structure. As shown in FIG. 3, a D2D radio frame 301 consists of ten subframes, numbered 0 to 9. In exemplary embodiments, each subframe is 1 ms in length and may be reserved for either a downlink "D" transmission or an uplink "U" transmission, or may be designated as a special timeslot "S". "S" timeslots typically are reserved to allow UEs to align their uplink timing transmissions with the eNB 105. However, it is noted that in D2D communications, a typical transmission range can be of the order of a few hundred meters with propagation delays on the order of a few microseconds. Under this scenario, most timing delays are negligible, making transmission gaps for timing alignment largely unnecessary. Accordingly, exemplary embodiments may, for instance, use only transmit and receive timeslots of transmission frames and do not need special timeslots or subframes to maintain timing alignments.

In certain embodiments, the first timeslot (e.g., subframe #0 of D2D radio frame 301) is predetermined as a Tx for the device pair head UE 102a to indicate on D2D PDCCH the modulation coding scheme (MCS), HARQ parameters, MIMO configuration, and timeslot configuration information used by the UEs 102a and 102b in device pair 102 for the current frame. The device pair head 102a may also transmit the D2D physical downlink shared channel (PDSCH) on the first timeslot, assuming D2D PDCCH and D2D PDSCH are Time Domain Multiplexed (as is the case for the PDCCH and PDSCH on a cellular access link).

In other embodiments, the last timeslot in the D2D radio frame 301 (e.g., subframe #9) may be predetermined as Rx for the device pair head 102a to listen to the feedback or timeslot request information from the UE 102b in the device pair 102 on D2D PUCCH. The D2D PDCCH could include ACK/NACK messages for packets transmitted by the slave device UE 102b on the previous TDD frame. Likewise, the D2D PUCCH can include ACK/NACK messages for packets transmitted by the device pair head 102a on the previous TDD frame as well as the channel quality information (CQI) based at least in part on pair head-slave link measurements. The UE 102b in the device pair 102 may also transmit the D2D physical uplink shared channel on the last timeslot of the frame 301, assuming D2D PUCCH and D2D PUSCH are Frequency Domain Multiplexed (as is the case for the PUCCH and PUSCH on a cellular access link).

In yet other embodiments, the UE 102b in the device pair 102 may also transmit the D2D PUSCH on any other pair head-scheduled Tx subframe assuming it is transmitting on the D2D PUSCH. This enables shorter D2D HARQ delays as the device pair head UE 102a can get an ACK/NACK from the slave UE 102b and re-transmit the packet to UE 102b without waiting for the last timeslot reserved for UE 102b. In practice, a processing delay of 3 ms (i.e., 3 subframes) in the device pair head 102a (and UE 102b) to process the D2D PDCCH/PUCCH and/or D2D PDSCH/PUSCH can be expected before the pair head UE 102a can re-transmit the packet to the slave UE 102b.

In another embodiment, the D2D PUCCH may include ACK/NACK messages for packets transmitted by the device pair head 102a on the previous TDD frame. It may also include CQI based at least in part on the device pair 102 link measurements by the UE 102b. If channel reciprocity can be assumed, it may be sufficient that only the device pair head UE 102a makes the link measurements.

Figure 4:
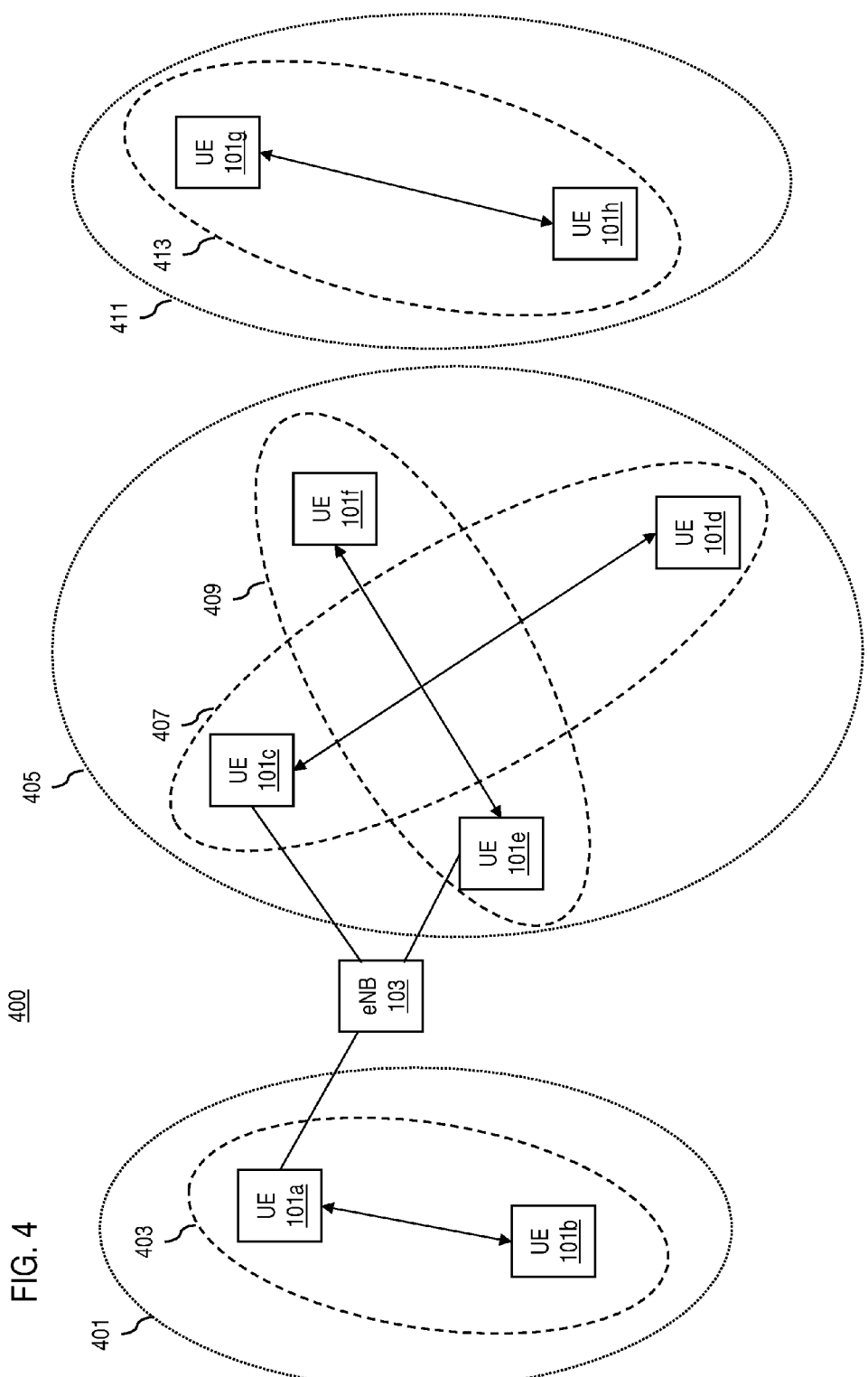
FIG. 4 is a diagram of device pairs organized into groups for device-to-device communications, according to an exemplary embodiment.

FIG. 4 is a diagram of groups organized into clusters for device-to-device communications, according to an exemplary embodiment. As shown, the network 400 includes three groups organized for D2D communications. Group 401 includes a device pair 403 comprised of UEs 101a and 101b; group 405 includes two device pairs (device pair 407 comprised of UEs 101c and 101d; and device pair 409 comprised of UEs 101e and 101f); and group 411 includes device pair 413 comprised of UEs 101g and 101h. As discussed previously, exemplary embodiments organize D2D devices into groups to, for example, minimize the potential for interference. For instance, the eNB 105 may use spatial orthogonality (timing advance and direction of arrival) and time orthogonality (subframe separated) to avoid near-far interference between clusters. If spatial and time orthogonality are not feasible, frequency orthogonality (physical resource block separated) may be employed. It is noted that generally frequency orthogonality cannot in itself deal effectively with near-far interference typically experienced in D2D communications.

Spatial reuse of can applied, for instance, to D2D groups that are located far away from each other to minimize interference (e.g., group 401 and group 405). For interfering device pairs (e.g., device pairs 407 and 409 within group 405), the eNB 105 can allocate resources that are orthogonal in time and frequency. For groups within different serving cells (e.g., group 405 and group 411), coordination of resource allocation with an interface (e.g., and X2 interface) between serving eNBs can be performed to ensure orthogonal resource allocations of device pairs and groups within the respective cells. Additionally, interference may also be minimized by the relative short distances between the UEs within the groups, providing the opportunity to apply different timeslot configurations (e.g., switching points) for different device pairs.

Figure 5:
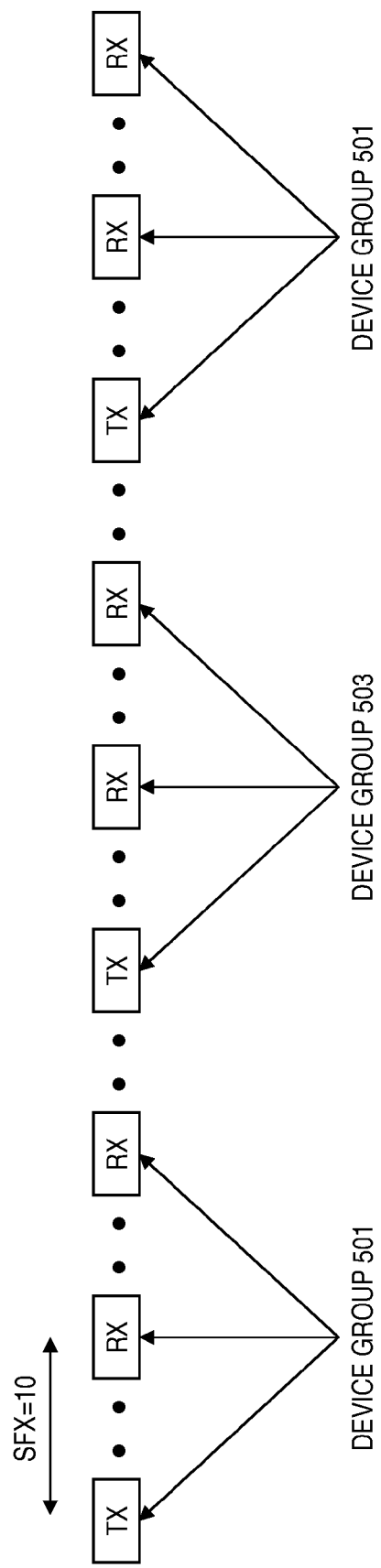
FIG. 5 is a diagram of a semi-persistent allocation process for a group of device pairs, according to an exemplary embodiment.

FIG. 5 is a diagram of a semi-persistent allocation process for a group of devices, according to an exemplary embodiment. As discussed previously, exemplary embodiments may semi-persistently allocate minimal resources to groups. An exemplary allocation scheme may, for instance, schedule a resource every ten subframes between two D2D device pairs with each device pair getting every three alternate allocations. Specifically, device pair 501 receives allocations at subframes (sfx) 10, 20, and 30; device pair 503 receives allocations at sfx 40, 50, and 60; and device pair 501 again receives allocations at 70, 80, and 90. Because the semi-persistent scheduling is separated by 10 subframes, the scheme enables dynamic scheduling of resources among the semi-persistent allocations as discussed with respect to FIGS. 6A and 6B.

Figure 6A:
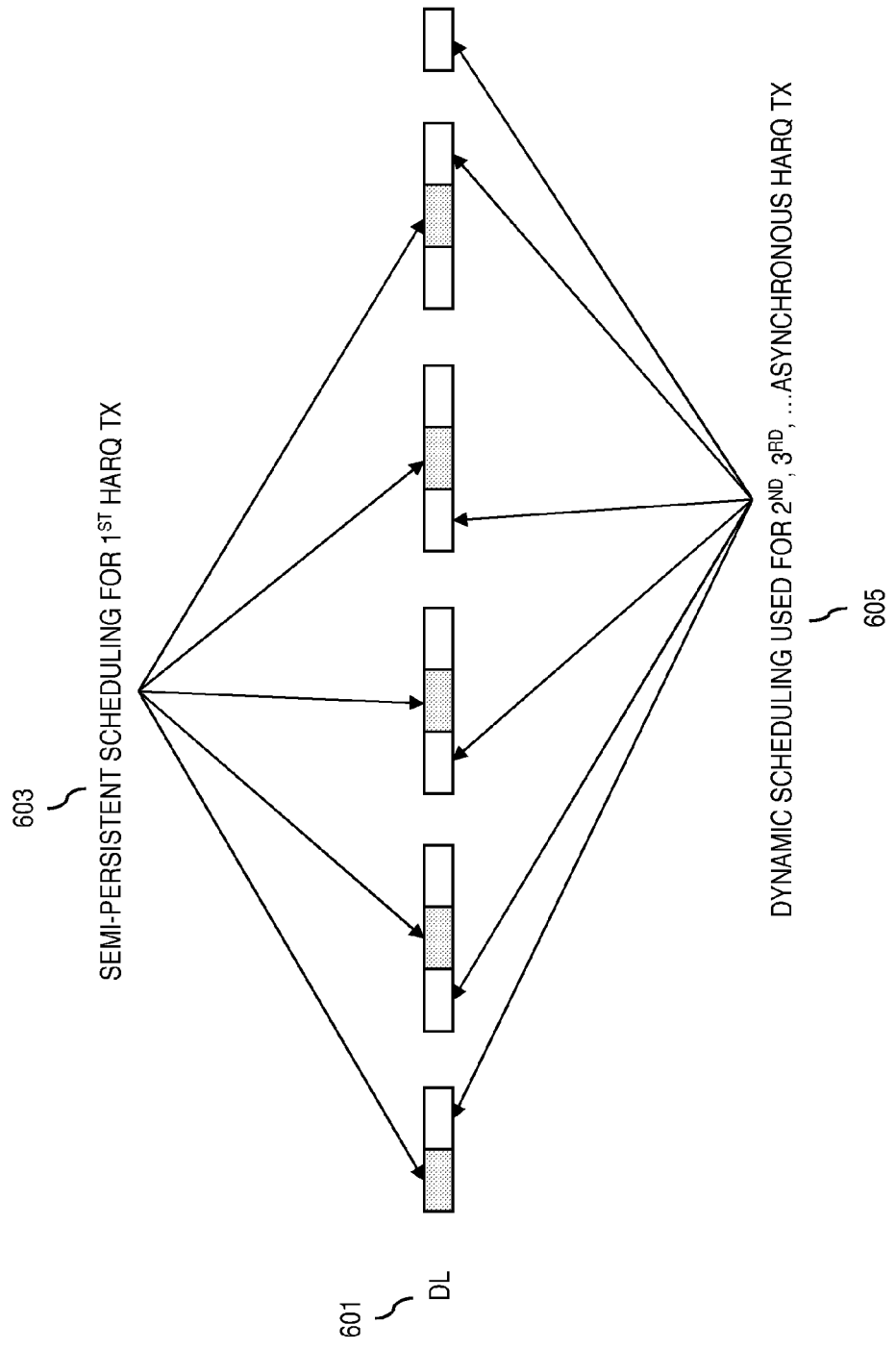
FIGS. 6A and 6B are diagrams of semi-persistent and dynamic scheduling interactions for scheduling resources for device-to-device communications in a downlink and an uplink respectively, according to various exemplary embodiments.
Figure 6B:
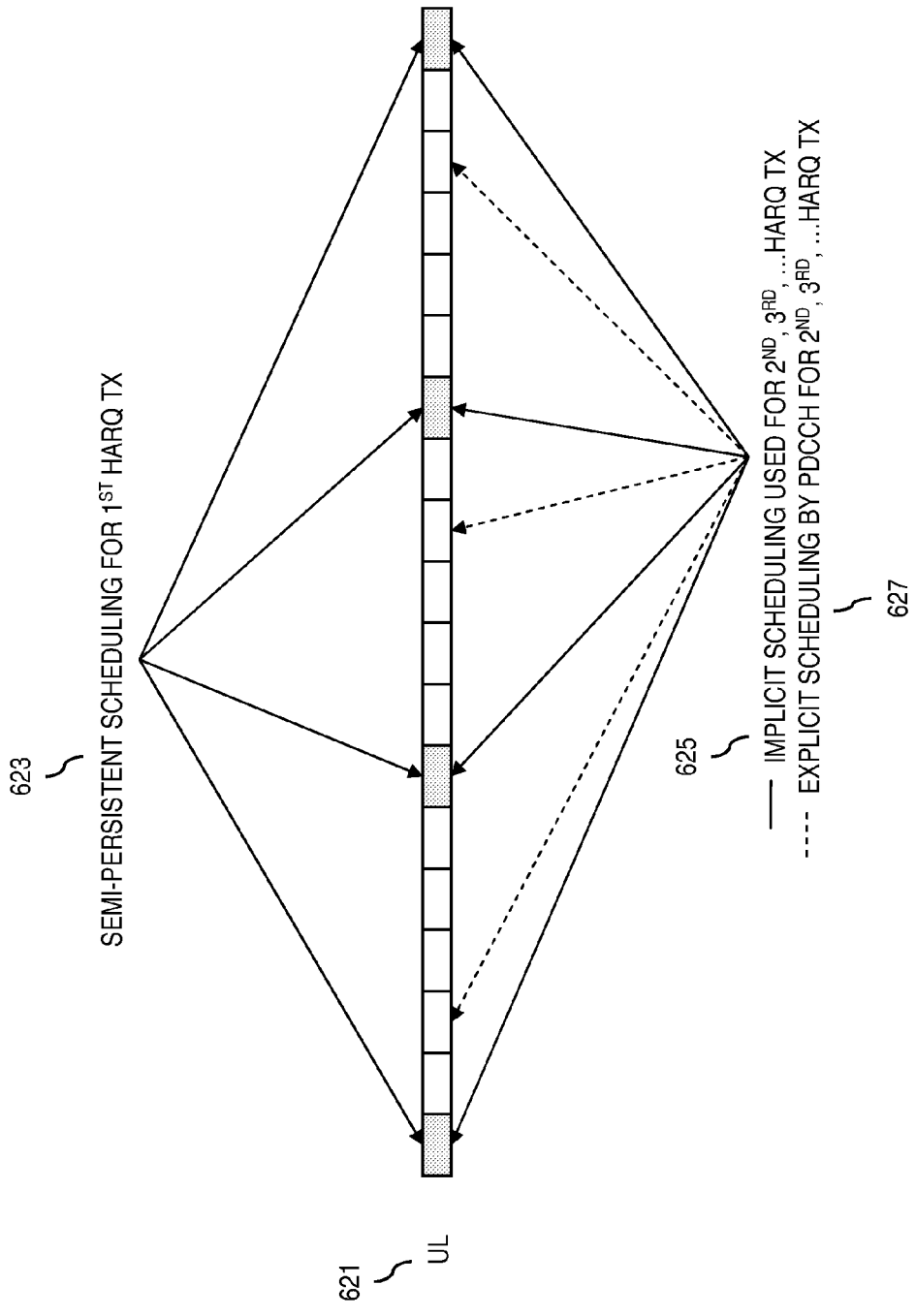

FIGS. 6A and 6B are diagrams of semi-persistent and dynamic scheduling interactions for scheduling resources for device-to-device communications in a downlink and an uplink respectively, according to various exemplary embodiments. On the downlink 601, semi-persistent allocations 603 (e.g., for H-ARQ transmissions) are scheduled at regular time intervals (e.g., every 10 subframes). This allows dynamic allocations 605 for additional transmissions such as H-ARQ retransmissions or asynchronous H-ARQ transmissions. Similarly, FIG. 6B depicts an analogous scheme for the uplink 621. Semi-persistent allocations 623 and 625 (e.g., for H-ARQ transmissions) are allocated implicitly at regular intervals. The semi-persistent allocations 623 and 625 are interspersed with explicitly schedule dynamic allocations 627. In exemplary embodiments, both semi-persistent and dynamic allocations may be signaled, for example, on a physical downlink control channel (PDCCH).

Figure 7:
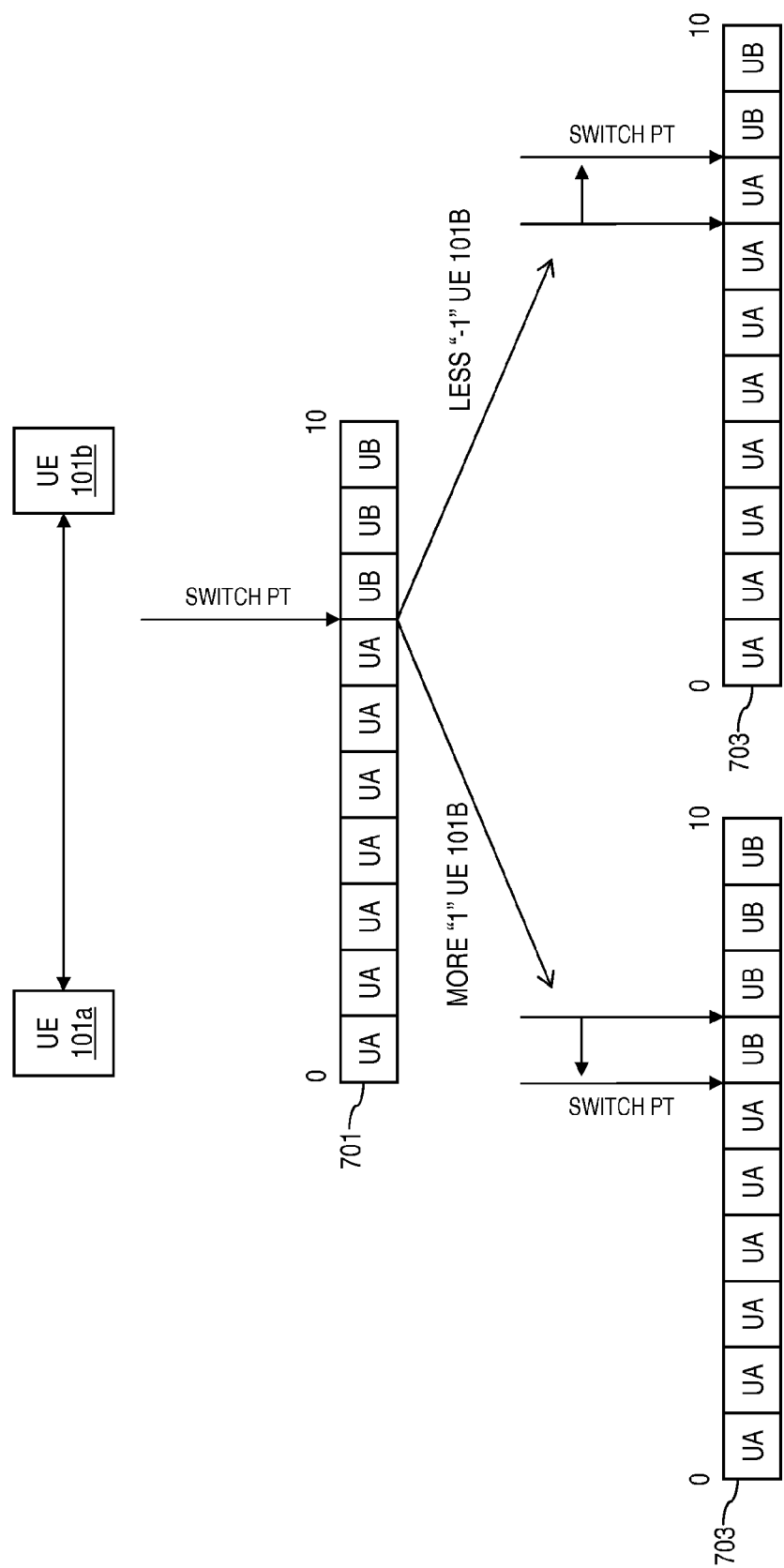
FIG. 7 is a diagram depicting a piggybank signaling mechanism for timeslot configuration, according to an exemplary embodiment.

FIG. 7 is a diagram depicting a piggybank signaling mechanism for timeslot configuration, according to an exemplary embodiment. A device pair comprising UE 101a and UE 101b are engaged in a D2D communication session with UE 101a designated as the device pair head. The initial resource allocation signaled from UE 101a to UE 101b in a frame with a timeslot configuration designating a Tx/Rx switching point at subframe 7. For timeslot configuration 703, the UE 101b has sent a piggyback relative request using a bit of 1 to indicate a need for an additional timeslot. Accordingly, the device pair head UE 101a allocates the additional timeslot by moving the Tx/Rx switching point to subframe 6. For timeslot configuration 705, the UE 101b has sent a piggyback relative request using a bit value of −1 to indicate the need for one less timeslot. Accordingly, the UE 101a changes the Tx/Rx switching point to subframe 8 in response to the request. Although the example depicts a frame consisting of 10 subframes, it is contemplated that the piggyback mechanism is applicable to frames consisting of any number of frames.

By way of example, the communication system of FIG. 1 utilizes an architecture compliant with the UMTS terrestrial radio access network (UTRAN) or Evolved UTRAN (E-UTRAN) in 3GPP, as next described.

FIGS. 8A-8D are diagrams of communication systems having exemplary LTE architectures, in which the system 100 of FIG. 1 can operate, according to various exemplary embodiments of the invention. By way of example (as discussed with respect to FIG. 1), the base stations 103 and the UEs 101 can communicate in system 800 using any access scheme, such as Time Division Multiple Access (TDMA), Code Division Multiple Access (CDMA), Wideband Code Division Multiple Access (WCDMA), Orthogonal Frequency Division Multiple Access (OFDMA) or Single Carrier Frequency Division Multiple Access (SC-FDMA) or a combination thereof. In an exemplary embodiment, both uplink and downlink can utilize WCDMA. In another exemplary embodiment, uplink utilizes SC-FDMA, while downlink utilizes OFDMA.

The communication system 800 is compliant with 3GPP LTE, entitled "Long Term Evolution of the 3GPP Radio Technology" (which is incorporated herein by reference in its entirety). As shown in FIG. 8A, one or more user equipment (UEs) 101 communicate with a network equipment, such as a base station 105, which is part of an access network (e.g., WiMAX (Worldwide Interoperability for Microwave Access), 3GPP LTE (or E-UTRAN), etc.). Under the 3GPP LTE architecture, base station 105 is denoted as an enhanced Node B (eNB).

The MME (Mobile Management Entity)/Serving Gateways 801 are connected to the eNBs 105 in a full or partial mesh configuration using tunneling over a packet transport network (e.g., Internet Protocol (IP) network) 803. Exemplary functions of the MME/Serving GW 801 include distribution of paging messages to the eNBs 105, IP header compression, termination of U-plane packets for paging reasons, and switching of U-plane for support of UE mobility. Since the GWs 801 serve as a gateway to external networks, e.g., the Internet or private networks 803, the GWs 801 include an Access, Authorization and Accounting system (AAA) 805 to securely determine the identity and privileges of a user and to track each user's activities. Namely, the MME Serving Gateway 801 is the key control-node for the LTE access-network and is responsible for idle mode UE tracking and paging procedure including retransmissions. Also, the MME 801 is involved in the bearer activation/deactivation process and is responsible for selecting the SGW (Serving Gateway) for a UE at the initial attach and at time of intra-LTE handover involving Core Network (CN) node relocation.

A more detailed description of the LTE interface is provided in 3GPP TR 25.813, entitled "E-UTRA and E-UTRAN: Radio Interface Protocol Aspects," which is incorporated herein by reference in its entirety.

Figure 8B:
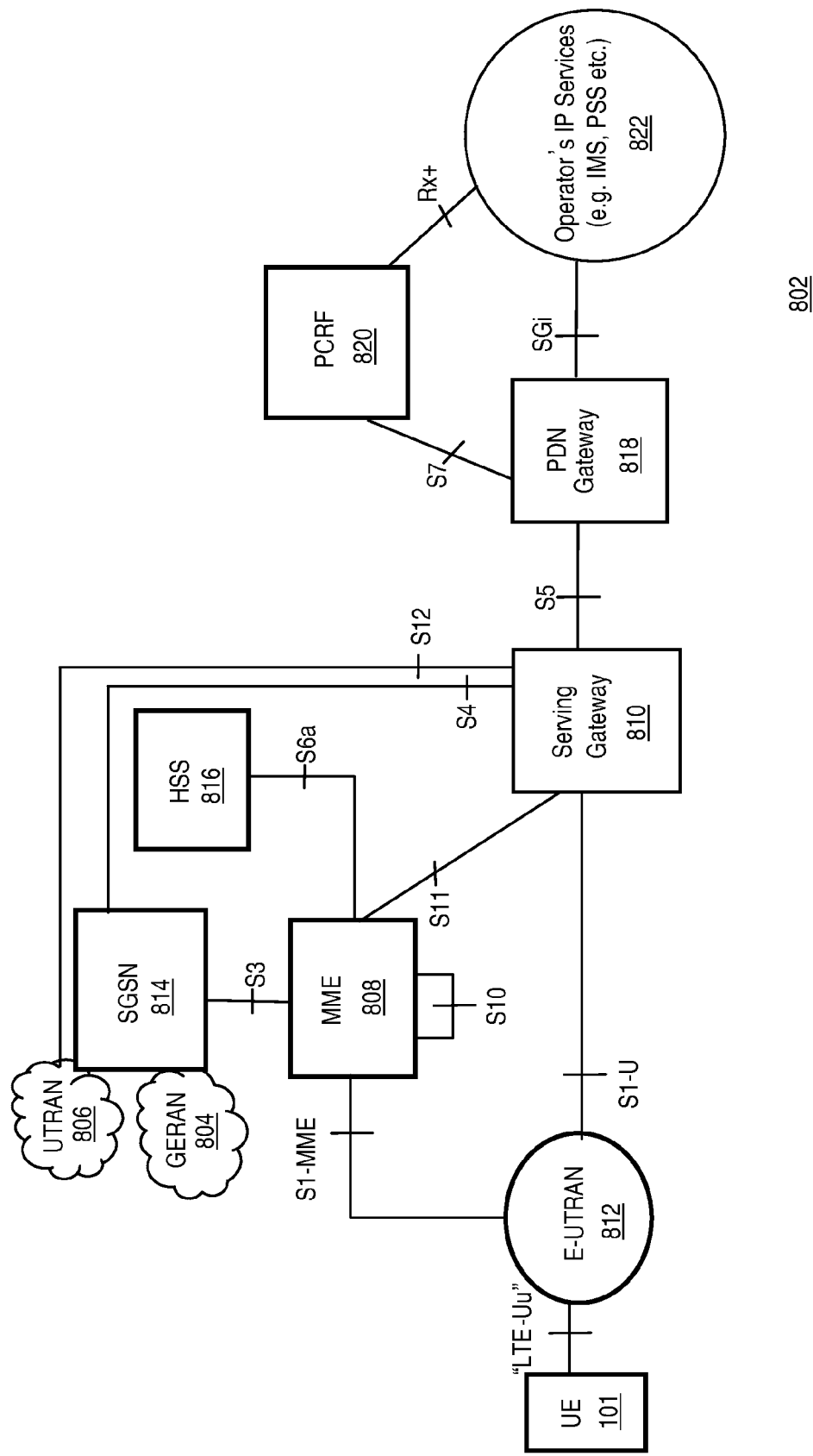

In FIG. 8B, a communication system 802 supports GERAN (GSM/EDGE radio access) 804, and UTRAN 806 based access networks, E-UTRAN 812 and non-3GPP (not shown) based access networks, and is more fully described in TR 23.882, which is incorporated herein by reference in its entirety. A key feature of this system is the separation of the network entity that performs control-plane functionality (MME 808) from the network entity that performs bearer-plane functionality (Serving Gateway 810) with a well defined open interface between them S11. Since E-UTRAN 812 provides higher bandwidths to enable new services as well as to improve existing ones, separation of MME 808 from Serving Gateway 810 implies that Serving Gateway 810 can be based on a platform optimized for signaling transactions. This scheme enables selection of more cost-effective platforms for, as well as independent scaling of, each of these two elements. Service providers can also select optimized topological locations of Serving Gateways 810 within the network independent of the locations of MMEs 808 in order to reduce optimized bandwidth latencies and avoid concentrated points of failure.

As seen in FIG. 8B, the E-UTRAN (e.g., eNB) 812 interfaces with UE via LTE-Uu. The E-UTRAN 812 supports LTE air interface and includes functions for radio resource control (RRC) functionality corresponding to the control plane MME 808. The E-UTRAN 812 also performs a variety of functions including radio resource management, admission control, scheduling, enforcement of negotiated uplink (UL) QoS (Quality of Service), cell information broadcast, ciphering/deciphering of user, compression/decompression of downlink and uplink user plane packet headers and Packet Data Convergence Protocol (PDCP).

The MME 808, as a key control node, is responsible for managing mobility UE identifies and security parameters and paging procedure including retransmissions. The MME 608 is involved in the bearer activation/deactivation process and is also responsible for choosing Serving Gateway 810 for the UE 101. MME 808 functions include Non Access Stratum (NAS) signaling and related security. MME 608 checks the authorization of the UE 101 to camp on the service provider's Public Land Mobile Network (PLMN) and enforces UE 101 roaming restrictions. The MME 808 also provides the control plane function for mobility between LTE and 2G/3G access networks with the S3 interface terminating at the MME 808 from the SGSN (Serving GPRS Support Node) 814.

The SGSN 814 is responsible for the delivery of data packets from and to the mobile stations within its geographical service area. Its tasks include packet routing and transfer, mobility management, logical link management, and authentication and charging functions. The S6a interface enables transfer of subscription and authentication data for authenticating/authorizing user access to the evolved system (AAA interface) between MME 808 and HSS (Home Subscriber Server) 816. The S10 interface between MMEs 808 provides MME relocation and MME 808 to MME 808 information transfer. The Serving Gateway 810 is the node that terminates the interface towards the E-UTRAN 812 via S1-U.

The S1-U interface provides a per bearer user plane tunneling between the E-UTRAN 812 and Serving Gateway 810. It contains support for path switching during handover between eNBs 812. The S4 interface provides the user plane with related control and mobility support between SGSN 814 and the 3GPP Anchor function of Serving Gateway 810.

The S12 is an interface between UTRAN 806 and Serving Gateway 810. Packet Data Network (PDN) Gateway 818 provides connectivity to the UE to external packet data networks by being the point of exit and entry of traffic for the UE. The PDN Gateway 818 performs policy enforcement, packet filtering for each user, charging support, lawful interception and packet screening. Another role of the PDN Gateway 818 is to act as the anchor for mobility between 3GPP and non-3GPP technologies such as WiMAX and 3GPP2 (CDMA 1X and EvDO (Evolution Data Only)).

The S7 interface provides transfer of QoS policy and charging rules from PCRF (Policy and Charging Role Function) 820 to Policy and Charging Enforcement Function (PCEF) in the PDN Gateway 818. The SGi interface is the interface between the PDN Gateway and the operator's IP services including packet data network 822. Packet data network 822 may be an operator external public or private packet data network or an intra operator packet data network, e.g., for provision of IMS (IP Multimedia Subsystem) services. Rx+ is the interface between the PCRF and the packet data network 822.

Figure 8C:
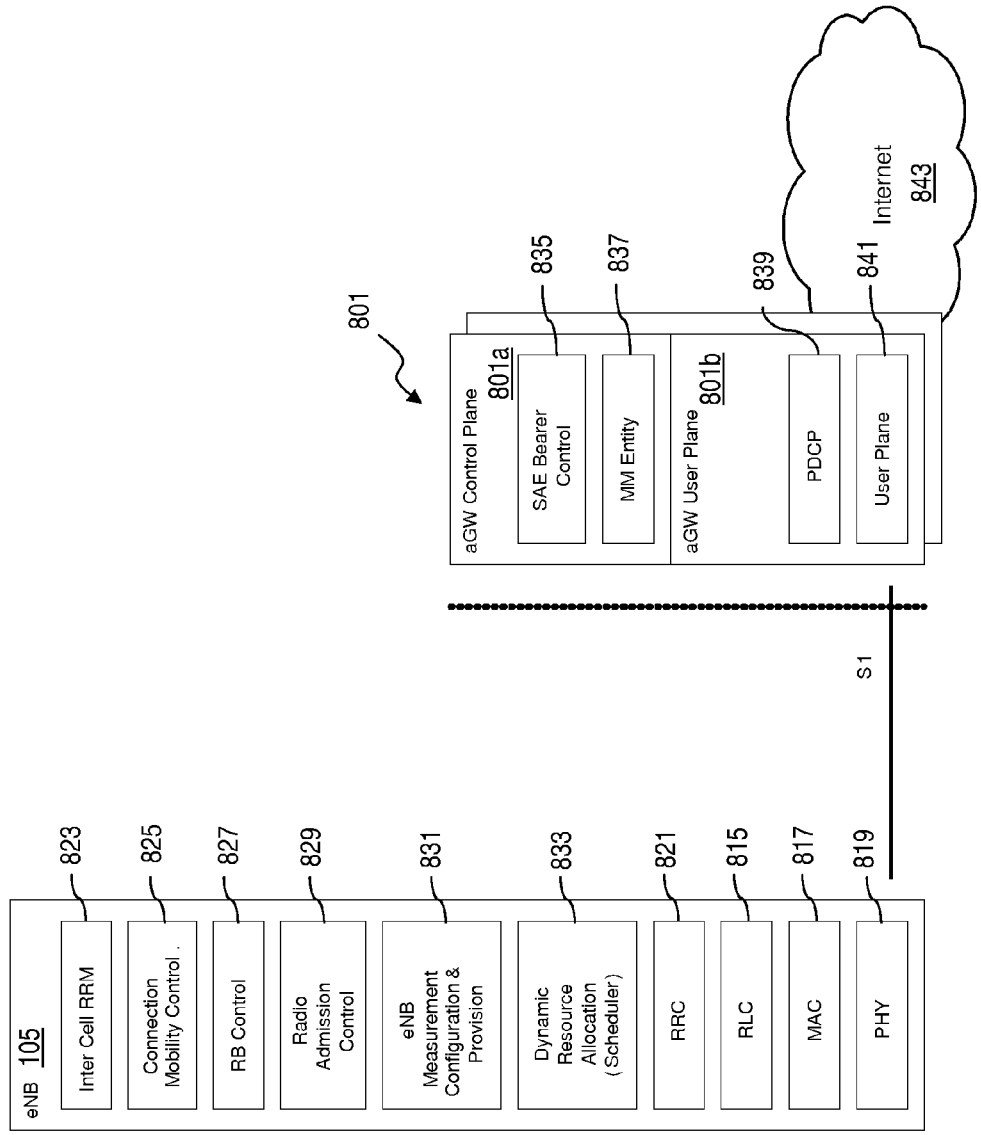

As seen in FIG. 8C, the eNB utilizes an E-UTRA (Evolved Universal Terrestrial Radio Access) (user plane, e.g., RLC (Radio Link Control) 815, MAC (Media Access Control) 817, and PHY (Physical) 819, as well as a control plane (e.g., RRC 821)). The eNB also includes the following functions: Inter Cell RRM (Radio Resource Management) 823, Connection Mobility Control 825, RB (Radio Bearer) Control 827, Radio Admission Control 829, eNB Measurement Configuration and Provision 831, and Dynamic Resource Allocation (Scheduler) 833.

The eNB communicates with the aGW 801 (Access Gateway) via an S1 interface. The aGW 801 includes a User Plane 801*a* and a Control plane 801*b*. The control plane 801*b* provides the following components: SAE (System Architecture Evolution) Bearer Control 835 and MM (Mobile Management) Entity 837. The user plane 801*b* includes a PDCP (Packet Data Convergence Protocol) 839 and a user plane functions 841. It is noted that the functionality of the aGW 201 can also be provided by a combination of a serving gateway (SGW) and a packet data network (PDN) GW. The aGW 801 can also interface with a packet network, such as the Internet 843.

Figure 8D:
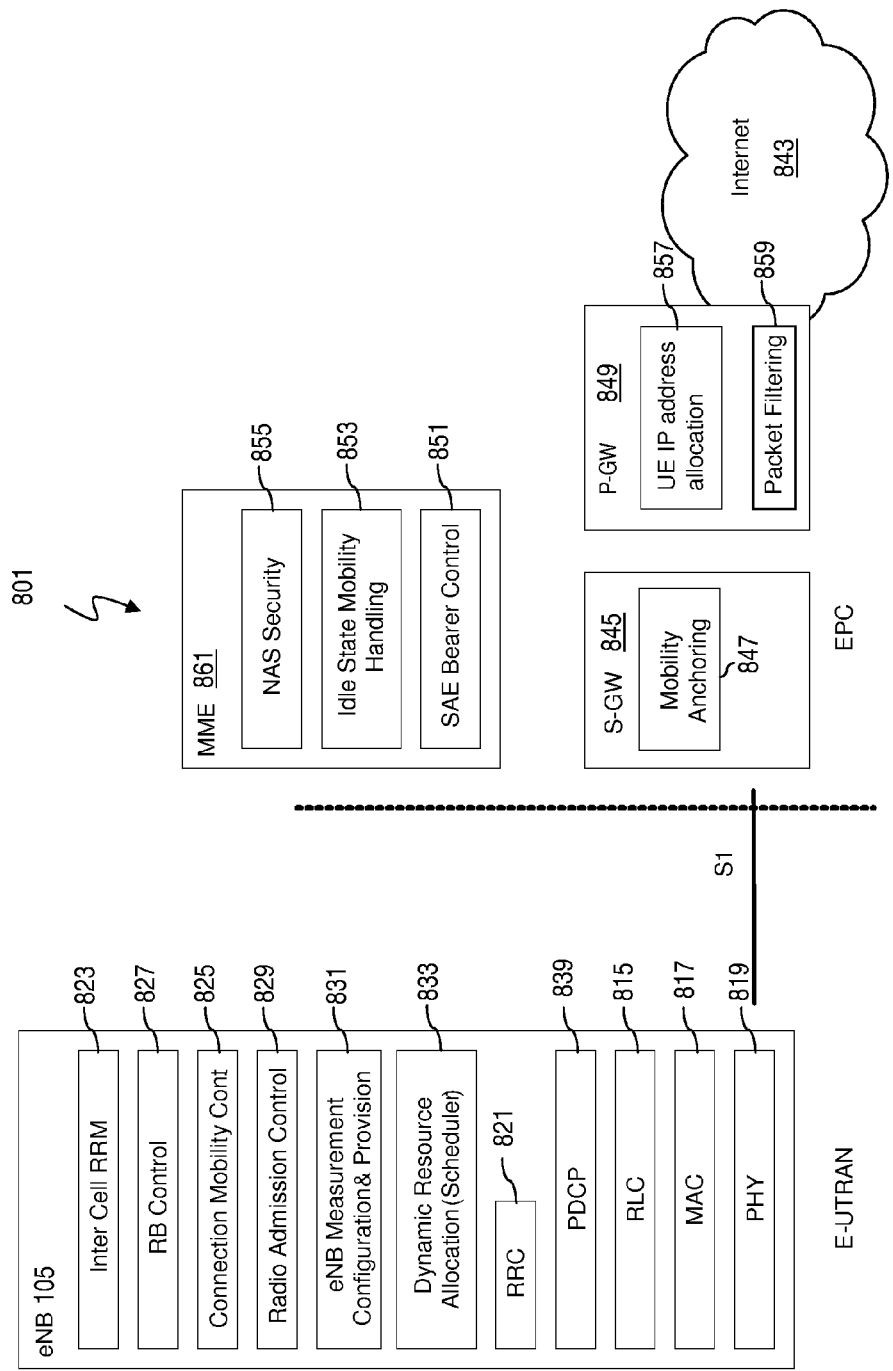

In an alternative embodiment, as shown in FIG. 8D, the PDCP (Packet Data Convergence Protocol) functionality can reside in the eNB rather than the GW 801. Other than this PDCP capability, the eNB functions of FIG. 8C are also provided in this architecture.

In the system of FIG. 8D, a functional split between E-UTRAN and EPC (Evolved Packet Core) is provided. In this example, radio protocol architecture of E-UTRAN is provided for the user plane and the control plane. A more detailed description of the architecture is provided in 3GPP TS 36.300.

The eNB 105 interfaces via the S1 to the Serving Gateway 845, which includes a Mobility Anchoring function 847. According to this architecture, the MME (Mobility Management Entity) 849 provides SAE (System Architecture Evolution) Bearer Control 851, Idle State Mobility Handling 853, and NAS (Non-Access Stratum) Security 855.

One of ordinary skill in the art would recognize that the processes for scheduling of resources for device-to-device communications may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below.

Figure 9:
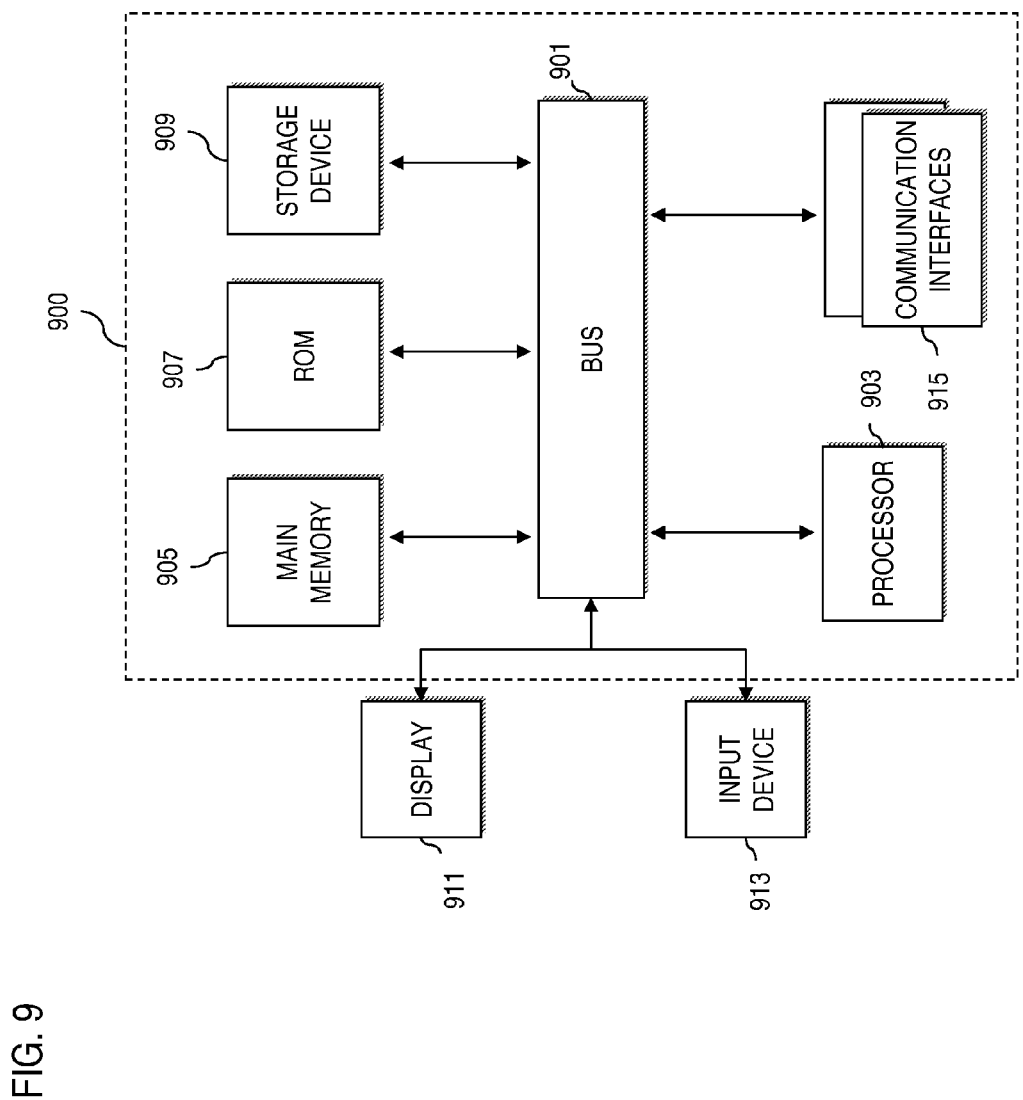
FIG. 9 is a diagram of hardware that can be used to implement an embodiment of the invention.

FIG. 9 illustrates exemplary hardware upon which various embodiments of the invention can be implemented. A computing system 900 includes a bus 901 or other communication mechanism for communicating information and a processor 903 coupled to the bus 901 for processing information. The computing system 900 also includes main memory 905, such as a random access memory (RAM) or other dynamic storage device, coupled to the bus 901 for storing information and instructions to be executed by the processor 903. Main memory 905 can also be used for storing temporary variables or other intermediate information during execution of instructions by the processor 903. The computing system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computing system 900 may be coupled via the bus 901 to a display 911, such as a liquid crystal display, or active matrix display, for displaying information to a user. An input device 913, such as a keyboard including alphanumeric and other keys, may be coupled to the bus 901 for communicating information and command selections to the processor 903. The input device 913 can include a cursor control, such as a mouse, a trackball, or cursor direction keys, for communicating direction information and command selections to the processor 903 and for controlling cursor movement on the display 911.

According to various embodiments of the invention, the processes described herein can be provided by the computing system 900 in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement may also be employed to execute the instructions contained in main memory 905. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 900 also includes at least one communication interface 915 coupled to bus 901. The communication interface 915 provides a two-way data communication coupling to a network link (not shown). The communication interface 915 sends and receives electrical, electromagnetic, or optical signals that carry digital data streams representing various types of information. Further, the communication interface 915 can include peripheral interface devices, such as a Universal Serial Bus (USB) interface, a PCMCIA (Personal Computer Memory Card International Association) interface, etc.

The processor 903 may execute the transmitted code while being received and/or store the code in the storage device 909, or other non-volatile storage for later execution. In this manner, the computing system 900 may obtain application code in the form of a carrier wave.

The term "computer-readable medium" as used herein refers to any medium that participates in providing instructions to the processor 903 for execution. Such a medium may take many forms, including but not limited to non-volatile media, volatile media, and transmission media. Non-volatile media include, for example, optical or magnetic disks, such as the storage device 909. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem or via a wireless link. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 10:
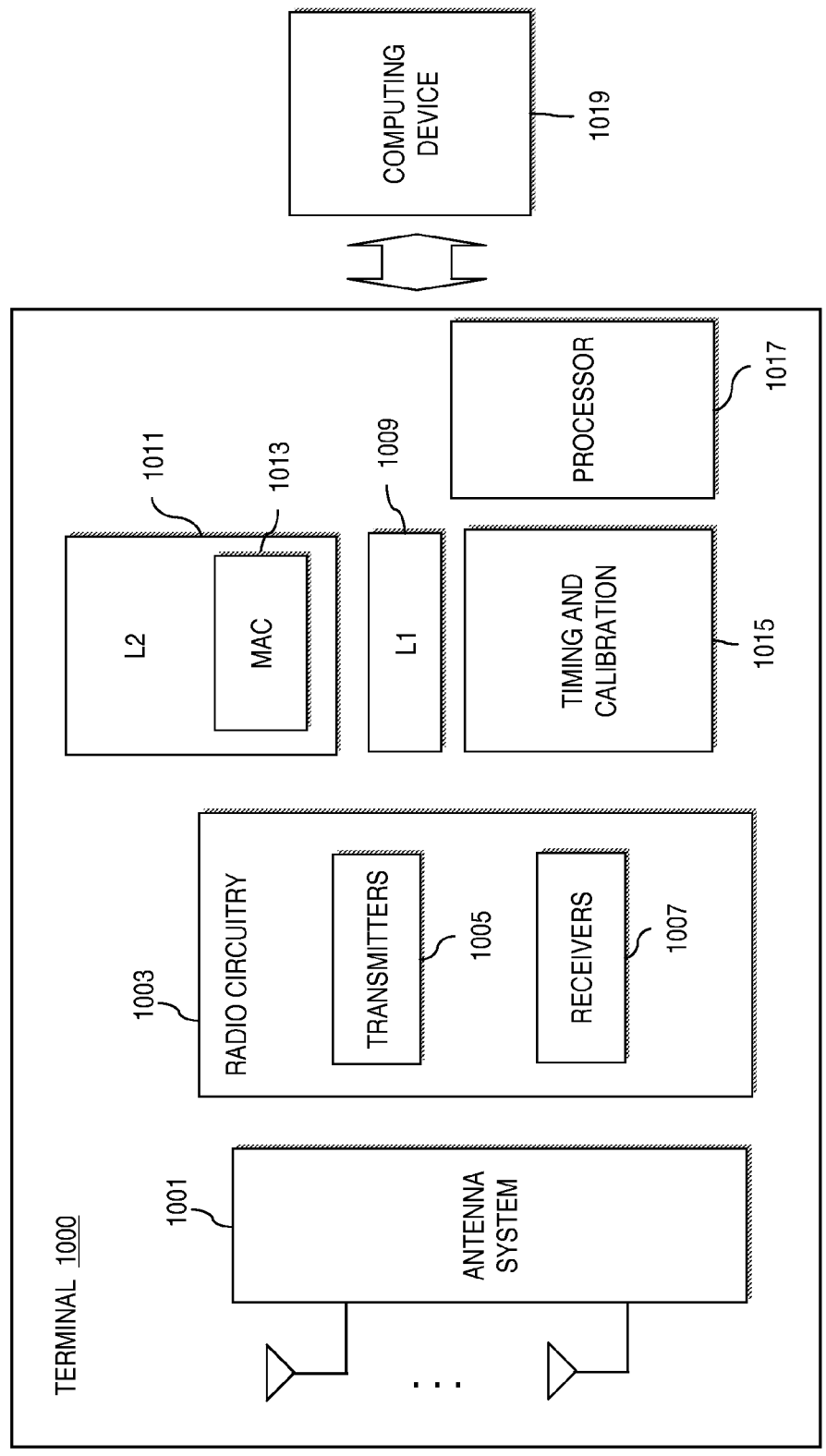
FIG. 10 is a diagram of exemplary components of an LTE terminal configured to operate in the systems of FIGS. 8A-8D, according to an embodiment of the invention.

FIG. 10 is a diagram of exemplary components of a user terminal configured to operate in the systems of FIGS. 8A-8D, according to an embodiment of the invention. A user terminal 1000 includes an antenna system 1001 (which can utilize multiple antennas) to receive and transmit signals. The antenna system 1001 is coupled to radio circuitry 1003, which includes multiple transmitters 1005 and receivers 1007. The radio circuitry encompasses all of the Radio Frequency (RF) circuitry as well as base-band processing circuitry. As shown, layer-1 (L1) and layer-2 (L2) processing are provided by units 1009 and 1011, respectively. Optionally, layer-3 functions can be provided (not shown). Module 1013 executes all Medium Access Control (MAC) layer functions. A timing and calibration module 1015 maintains proper timing by interfacing, for example, an external timing reference (not shown). Additionally, a processor 1017 is included. Under this scenario, the user terminal 1000 communicates with a computing device 1019, which can be a personal computer, work station, a Personal Digital Assistant (PDA), web appliance, cellular phone, etc.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   designating two user equipments as a pair for device-to-device communications, each of the user equipment being configured to communicate directly with each other;
   designating one of the user equipment within the pair as a pair head;
   allocating an orthogonal resource of a network to the pair;
   wherein the pair head is configured to receive a transmit/receive timeslot configuration change request from the other user equipment within the pair and
   allocate a transmit/receive timeslot configuration to the other user equipment based on the request, wherein the request comprising a relative or absolute request for a transmit/receive timeslot configuration change using piggyback information.

2. A method according to claim 1, wherein the pair is among a plurality of pairs, the method further comprising:
   organizing one or more of the pairs into a group;
   designating one of the user equipment within the group as a group head; and
   allocating an orthogonal resource of a network to the group,
   wherein the group head is configured to further allocate the resource to the one or more pairs within the group for device-to-device communications.

3. A method according to claim 1, further comprising:
   receiving a device-to-device connection request from one of the two user equipments, the one user equipment sending a device-to-device connection request being designated as the pair head.

4. An apparatus comprising:
   at least one processor; and
   at least one memory including computer program code
   the at least one memory and the computer program code configured to, with the at least one processor, cause the apparatus to perform at least the following:
   designate two user equipments as a pair for device-to-device communications, each of the user equipment being configured to communicate directly with each other;
   designate one of the user equipment within the pair as a pair head;
   allocate an orthogonal resource of a network to the pair;
   wherein the pair head is configured to receive a transmit/receive timeslot configuration change request from the other user equipment within the pair and
   allocate a transmit/receive timeslot configuration to the other user equipment based on the request, wherein the request comprising a relative or absolute request for a transmit/receive timeslot configuration change using piggyback information.

5. An apparatus according to claim 4, wherein the pair is among a plurality of pairs, and wherein the at least one memory and the computer program code further configured to, with the at least one processor, cause the apparatus to organize one or more of the pairs into a group;
   designate one of the user equipments within the group as a group head;
   and allocate an orthogonal resource of a network to the group,
   wherein the group head being configured to allocate the resource to the one or more pairs within the group for device-to-device communications.

6. An apparatus according to claim 5, wherein the group head allocates the resource to the pair head based at least in part on one or more of a pair head buffer status report, device-to-device link quality measurement, and requested quality of service level.

7. An apparatus according to claim 5, wherein the group head is configured to request one of fewer and additional resources from the network based at least in part on one or more of a pair head buffer status report, device-to-device link quality measurement, and requested quality of service level; and wherein the additional resources from the network are allocated by semi-persistent or dynamic scheduling.

8. An apparatus according to claim 4, wherein the at least one memory and the computer program code further configured to, with the at least one processor, cause the apparatus to receive a device-to-device connection request from one of the two user equipments, and the one user equipment being designated as the pair head.

9. An apparatus according to claim 4, wherein the at least one memory and the computer program code further configured to, with the at least one processor, cause the apparatus to allocate resources directly to the pair based at least in part on one or more of a pair head buffer status report, device-to-device link quality measurement, and requested quality of service level,
wherein the resource is allocated directly by semi-persistent or dynamic scheduling.

10. An apparatus according to claim 4, wherein the at least one memory and the computer program code further configured to, with the at least one processor, cause the apparatus to estimate the transmission power and proximity of the user equipment, wherein a user equipment is included into the group based at least in part on the estimated transmission power and proximity, to allocate a minimum level of a resource to the group, and to increase the resource allocation based at least in part on the resource requirements of the user equipment within the group.

11. An apparatus comprising:
at least one processor; and
at least one memory including computer program code
the at least one memory and the computer program code configured to, with the at least one processor, cause the apparatus to perform at least the following:
receive an allocation of an orthogonal network resource from a base station for device-to-device communications among a group of user equipments;
receive an indication to act as a group head for the device-to-device communications;
allocate the resource to the other user equipment within the group based at least in part on one or more of a pair head buffer status report, device-to-device link quality measurement, and requested quality of service level;
wherein the pair head is configured to receive transmit/receive timeslot configuration change request from the other user equipment within the pair and
allocate a transmit/receive timeslot configuration to the other user equipment based on the request, wherein the request comprising a relative or absolute request for a transmit/receive timeslot configuration change using piggyback information.

12. A method comprising;
receiving an allocation of an orthogonal network resource for device-to-device communications between a pair of user equipment;
receiving an indication to act as a pair head for the device-to-device communications;
allocating the resource to the other user equipment within the pair by changing a transmit/receive timeslot configuration allowing time domain duplexing mode operations based at least in part on the buffer status report from the other user equipment in the pair and its own buffer status, device-to-device link quality measurement, and requested quality of service level;
receiving transmit/receive timeslot configuration change request from the other user equipment within the pair, the request comprising a relative or absolute request for a transmit/receive timeslot configuration change using piggyback information; and
allocating the transmit/receive timeslot configuration to the other user equipment based on the request.

13. A computer program product comprising a computer-readable non-transitory medium bearing computer program code embodied therein for use with a computer, the computer program code comprising:
code for receiving an allocation of an orthogonal network resource for device-to-device communications between a pair of user equipment;
code for receiving an indication to act as a pair head for the device-to-device communications;
code for allocating the resource to the other user equipment within the pair by changing a transmit/receive timeslot configuration allowing time domain duplexing mode operations based at least in part on the buffer status report from the other user equipment in the pair and its own buffer status, device-to-device link quality measurement, and requested quality of service level;
code for receiving a transmit/receive timeslot configuration change request from the other user equipment within the pair, the request comprising a relative or absolute request for a transmit/receive timeslot configuration change using piggyback information; and
code for allocating the transmit/receive timeslot configuration to the other user equipment based on the request.

14. An apparatus comprising:
at least one processor; and
at least one memory including computer program code
the at least one memory and the computer program code configured to, with the at least one processor, cause the apparatus to perform at least the following:
receive an allocation of an orthogonal network resource for device-to-device communications between a pair of user equipment;
receive an indication to act as a pair head for the device-to-device communications;
allocate the resource to the other user equipment within the pair by changing a transmit/receive timeslot configuration allowing time domain duplexing mode operations based at least in part on one the buffer status report from the other user equipment in the pair and its own buffer status, device-to-device link quality measurement, and requested quality of service level;
receive a transmit/receive timeslot configuration change request from the other user equipment within the pair, the request comprising a relative or absolute request for a transmit/receive timeslot configuration change using piggyback information; and
allocate the transmit/receive timeslot configuration to the other user equipment based on the request.

15. An apparatus according to claim 14, wherein the piggyback information is specified by a relative request as a bit and the value of the bit setting as one set of:
a first set being that the bit value of 1 indicating a request for one more transmit timeslot for the other user equipment in a pair and one less transmission timeslot for the pair head; and the bit value of −1 indicating a request for one less transmit timeslot for the other user equipment in a pair and more transmission timeslot for the pair head; and
a second set being that the bit value of 1 indicating a request for one more receive timeslot for the other user equipment in a pair and one less receive timeslot for the pair head; and the bit value of −1 indicating a request for one less receive timeslot for the other user equipment in a pair and more receive timeslot for the pair head.

16. An apparatus according to claim 14, wherein the piggyback information is specified by an absolute request indicated by N bits where N=log 2 (TotalTxRxSlotNum) and where TotalTxRxSlotNum indicates the total number of available transmit/receive timeslots and where absolute request indicates the number of transmit timeslots requested by the other user equipment in a pair.

17. An apparatus according to claim 14, further comprising:
   a transmit/receive timeslot configuration change request being in a designated transmit timeslot in current frame from the other user equipment within the pair; and
   allocating the transmit/receive timeslot configuration by request acknowledgement in a designated Rx timeslot in the next frame to the other user equipment.

18. An apparatus according to claim 14, wherein the at least one memory and the computer program code further configured to, with the at least one processor, cause the apparatus to transmit control signaling to the other user equipment in the pair, wherein the control signaling comprising one or more of a modulation and coding for the device-to-device communications and an error control scheme for the pair.

* * * * *

UNITED STATES PATENT AND TRADEMARK OFFICE
CERTIFICATE OF CORRECTION

PATENT NO. : 8,761,099 B2  
APPLICATION NO. : 13/145105  
DATED : June 24, 2014  
INVENTOR(S) : Charbit et al.

Page 1 of 1

It is certified that error appears in the above-identified patent and that said Letters Patent is hereby corrected as shown below:

In the Claims

Claim 12, col. 17, line 61 insert --a-- in between "receiving" and "transmit/receive".

Signed and Sealed this  
Ninth Day of September, 2014

Michelle K. Lee  
*Deputy Director of the United States Patent and Trademark Office*